United States Patent [19]

Sugiura et al.

[11] Patent Number: 4,683,492

[45] Date of Patent: Jul. 28, 1987

[54] METHOD AND APPARATUS FOR RECORDING A FULL-COLOR IMAGE WITH A PLURALITY OF COLORANTS ON THE BASIS OF A SET OF AREA FACTORS FOR THE COLORANTS SELECTED FROM A PLURALITY OF SETS OF AREA FACTORS CALCULATED FROM A PLURALITY OF SETS OF EQUATIONS

[75] Inventors: Susumu Sugiura, Yamato; Yasuo Kohzato, Tokyo, both of Japan

[73] Assignee: Canon Kabushiki Kaisha, Tokyo, Japan

[21] Appl. No.: 586,188

[22] Filed: Mar. 5, 1984

[30] Foreign Application Priority Data

| Mar. 8, 1983 | [JP] | Japan | 58-37717 |
| Mar. 8, 1983 | [JP] | Japan | 58-37718 |
| Nov. 18, 1983 | [JP] | Japan | 58-218297 |
| Nov. 18, 1983 | [JP] | Japan | 58-218299 |

[51] Int. Cl.$^4$ .......................... G03F 3/08; H04N 1/46
[52] U.S. Cl. ...................................... 358/80; 358/75; 358/79
[58] Field of Search ........................ 358/75, 78, 79, 80

[56] References Cited

U.S. PATENT DOCUMENTS

| 3,404,221 | 10/1968 | Loughren | 358/75 |
| 3,801,736 | 4/1974 | Kosaka et al. | 358/80 |
| 3,804,531 | 4/1974 | Kosaka et al. | 356/405 |
| 4,413,275 | 11/1983 | Horiuchi et al. | 358/78 |
| 4,533,928 | 8/1985 | Sugiura et al. | 358/80 |

OTHER PUBLICATIONS

Hardy, Arthur C., et al., "Color Correction in Color Printing", Journal of the Optical Society of America, vol. 38, No. 4, Apr. 1948, pp. 300–307.

Primary Examiner—James J. Groody
Assistant Examiner—Randall S. Svihla
Attorney, Agent, or Firm—Fitzpatrick,, Cella, Harper & Scinto

[57] ABSTRACT

A color recording method allows digital color recording by calculating fractional areas to be covered by each color used in recording. A plurality of sets of area factors for the colors are calculated from a plurality of sets of color equations corresponding to a plurality of sets of magnitude relationships between the area factors. One set of area factors having the same magnitude relationships as the set of magnitude relationships corresponding to the set of color equations from which the one set of area factors was calculated is selected for color image production. The colors can consist, for example, of three subtractive primary colors or of black and two subtractive primary colors, in different superposition combinations. A color recording apparatus has a camera, a processor, a memory and a printer. Reflectivities of inks of different colors are measured and substituted in the color equations. An optimum color image is produced, compensated for differences between input and output system characteristics.

14 Claims, 65 Drawing Figures

FIG. 1
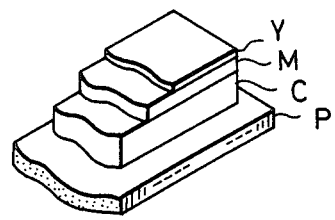
FIG. 2(A)
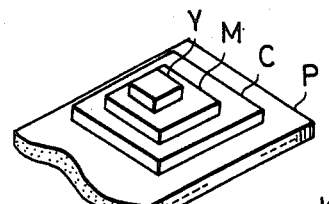
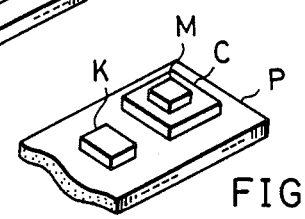
FIG. 2(B)
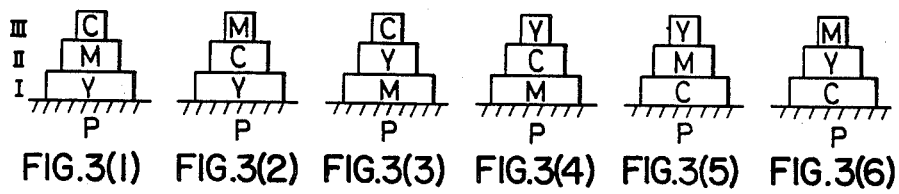
FIG.3(1)  FIG.3(2)  FIG.3(3)  FIG.3(4)  FIG.3(5)  FIG.3(6)

| COLOR\COMBINATION | | (1) | (2) | (3) | (4) | (5) | (6) |
|---|---|---|---|---|---|---|---|
| WHITE | W | 1−y | 1−y | 1−m | 1−m | 1−c | 1−c |
| BLACK | K | c | m | c | y | y | m |
| RED | R | m−c | 0 | y−c | 0 | 0 | 0 |
| GREEN | G | 0 | c−m | 0 | 0 | 0 | y−m |
| BLUE | B | 0 | 0 | 0 | c−y | m−y | 0 |
| YELLOW | Y | y−m | y−c | 0 | 0 | 0 | 0 |
| MAGENTA | M | 0 | 0 | m−y | m−c | 0 | 0 |
| CYAN | C | 0 | 0 | 0 | 0 | c−m | c−y |

(AREA FACTOR)

FIG. 6

| COMBINATION | COLOR MODIFICATION EQUATION | CONDITION |
|---|---|---|
| (1) | $\begin{bmatrix} R-Rw \\ G-Gw \\ B-Bw \end{bmatrix} = \begin{bmatrix} (Ry-Rw) & (Rmy-Ry) & (Rymc-Rmy) \\ (Gy-Gw) & (Gmy-Gy) & (Gymc-Gmy) \\ (By-Bw) & (Bmy-By) & (Bymc-Bmy) \end{bmatrix} \begin{bmatrix} y \\ m \\ c \end{bmatrix}$ | $1 \geq y \geq m \geq c \geq 0$ |
| (2) | $\begin{bmatrix} R-Rw \\ G-Gw \\ B-Bw \end{bmatrix} = \begin{bmatrix} (Ry-Rw) & (Rymc-Ryc) & (Ryc-Ry) \\ (Gy-Gw) & (Gymc-Gyc) & (Gyc-Gy) \\ (By-Bw) & (Bymc-Byc) & (Byc-By) \end{bmatrix} \begin{bmatrix} y \\ m \\ c \end{bmatrix}$ | $1 \geq y \geq c \geq m \geq 0$ |
| (3) | $\begin{bmatrix} R-Rw \\ G-Gw \\ B-Bw \end{bmatrix} = \begin{bmatrix} (Rmy-Rm)(Rm-Rw) & (Rymc-Rmy) \\ (Gmy-Gm)(Gm-Gw) & (Gymc-Gmy) \\ (Bmy-Bm)(Bm-Bw) & (Bymc-Bmy) \end{bmatrix} \begin{bmatrix} y \\ m \\ c \end{bmatrix}$ | $1 \geq m \geq y \geq c \geq 0$ |
| (4) | $\begin{bmatrix} R-Rw \\ G-Gw \\ B-Bw \end{bmatrix} = \begin{bmatrix} (Rymc-Rmc)(Rm-Rw) & (Rmc-Rm) \\ (Gymc-Gmc)(Gm-Gw) & (Gmc-Gm) \\ (Bymc-Bmc)(Bm-Bw) & (Bmc-Bm) \end{bmatrix} \begin{bmatrix} y \\ m \\ c \end{bmatrix}$ | $1 \geq m \geq c \geq y \geq 0$ |
| (5) | $\begin{bmatrix} R-Rw \\ G-Gw \\ B-Bw \end{bmatrix} = \begin{bmatrix} (Rymc-Rmc)(Rmc-Rc) & (Rc-Rw) \\ (Gymc-Gmc)(Gmc-Gc) & (Gc-Gw) \\ (Bymc-Bmc)(Bmc-Bc) & (Bc-Bw) \end{bmatrix} \begin{bmatrix} y \\ m \\ c \end{bmatrix}$ | $1 \geq c \geq m \geq y \geq 0$ |
| (6) | $\begin{bmatrix} R-Rw \\ G-Gw \\ B-Bw \end{bmatrix} = \begin{bmatrix} (Ryc-Rc) & (Rymc-Ryc) & (Rc-Rw) \\ (Gyc-Gc) & (Gymc-Gyc) & (Gc-Gw) \\ (Byc-Bc) & (Bymc-Byc) & (Bc-Bw) \end{bmatrix} \begin{bmatrix} y \\ m \\ c \end{bmatrix}$ | $1 \geq c \geq y \geq m \geq 0$ |

FIG. 7

| COMBI-NATION | SIMPLIFIED EQUATION | CONDITION |
|---|---|---|
| (1) | $R = 1 - c$<br>$G = 1 - m$<br>$B = 1 - y$ | $1 \geq y \geq m \geq c \geq 0$ |
| (2) | $R = 1 - c$<br>$G = 1 - mGc - c(1 - Gc)$<br>$B = 1 - y$ | $1 \geq y \geq c \geq m \geq 0$ |
| (3) | $R = 1 - c$<br>$G = 1 - m$<br>$B = 1 - m(1 - Bm) - yBm$ | $1 \geq m \geq y \geq c \geq 0$ |
| (4) | $R = 1 - c$<br>$G = 1 - m$<br>$B = 1 - yBcBm - m(1-Bm) + c(BcBm-Bm)$ | $1 \geq m \geq c \geq y \geq 0$ |
| (5) | $R = 1 - c$<br>$G = 1 - mGc - c(1 - Gc)$<br>$B = 1 - c(1 - Bc) + m(Bm-1)Bc - yBmBc$ | $1 \geq c \geq m \geq y \geq 0$ |
| (6) | $R = 1 - c$<br>$G = 1 - mGc - c(1 - Gc)$<br>$B = 1 - yBc - c(1 - Bc)$ | $1 \geq c \geq y \geq m \geq 0$ |

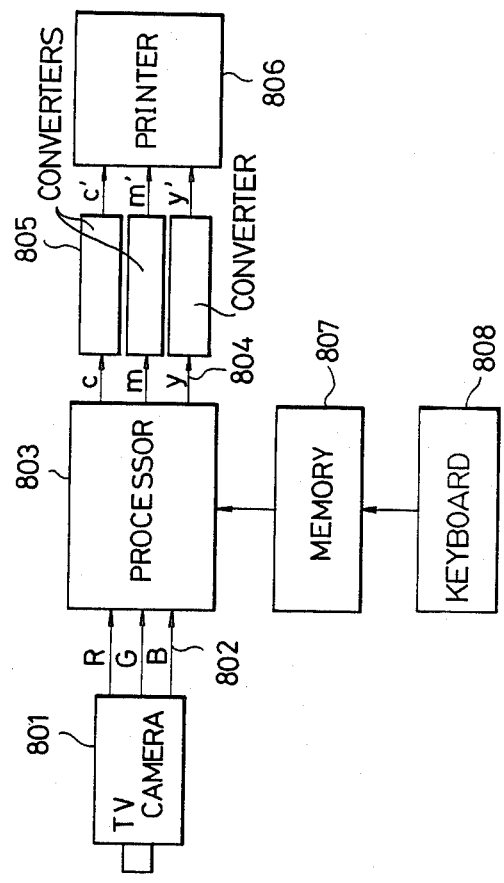

| COLOR | COMBINATION | AREA FACTOR | | | | | |
|---|---|---|---|---|---|---|---|
| | | (1) | (2) | (3) | (4) | (5) | (6) |
| WHITE | W | 1−y | 1−y | 1−m | 1−m | 1−c | 1−c |
| BLACK | K | c | m | c | y | y | m |
| RED | R | m−c | o | y−c | o | o | o |
| GREEN | G | o | c−m | o | o | o | y−m |
| BLUE | B | o | o | o | c−y | m−y | o |
| YELLOW | Y | y−m | y−c | o | o | o | o |
| MAGENTA | M | o | o | m−y | m−c | o | o |
| CYAN | C | o | o | o | o | c−m | c−y |

FIG. 15

| NO | INK SUPERPOSITION | COLOR MODIFICATION EQUATION | CONDITION |
|---|---|---|---|
| (1) | C/M/Y | $\begin{bmatrix} R_T-R_w \\ G_T-G_w \\ B_T-B_w \end{bmatrix} = \begin{bmatrix} (R_y-R_w)(R_{ym}-R_y)(R_{ymc}-R_{ym}) \\ (G_y-G_w)(G_{ym}-G_y)(G_{ymc}-G_{ym}) \\ (B_y-B_w)(B_{ym}-B_y)(B_{ymc}-B_{ym}) \end{bmatrix} \begin{bmatrix} y \\ m \\ c \end{bmatrix}$ | $1 \geq y \geq m \geq c \geq 0$ |
| (2) | C/M/Y | $\begin{bmatrix} R_T-R_w \\ G_T-G_w \\ B_T-B_w \end{bmatrix} = \begin{bmatrix} (R_y-R_w)(R_{ymc}-R_{yc})(R_{yc}-R_y) \\ (G_y-G_w)(G_{ymc}-G_{yc})(G_{yc}-G_y) \\ (B_y-B_w)(B_{ymc}-B_{yc})(B_{yc}-B_y) \end{bmatrix} \begin{bmatrix} y \\ m \\ c \end{bmatrix}$ | $1 \geq y \geq c \geq m \geq 0$ |
| (3) | C/M/Y | $\begin{bmatrix} R_T-R_w \\ G_T-G_w \\ B_T-B_w \end{bmatrix} = \begin{bmatrix} (R_{ym}-R_m)(R_m-R_w)(R_{ymc}-R_{ym}) \\ (G_{ym}-G_m)(G_m-G_w)(G_{ymc}-G_{ym}) \\ (B_{ym}-B_m)(B_m-B_w)(B_{ymc}-B_{ym}) \end{bmatrix} \begin{bmatrix} y \\ m \\ c \end{bmatrix}$ | $1 \geq m \geq y \geq c \geq 0$ |
| (4) | C/Y/M | $\begin{bmatrix} R_T-R_w \\ G_T-G_w \\ B_T-B_w \end{bmatrix} = \begin{bmatrix} (R_{ymc}-R_{mc})(R_{mc}-R_m)(R_m-R_w) \\ (G_{ymc}-G_{mc})(G_{mc}-G_m)(G_m-G_w) \\ (B_{ymc}-B_{mc})(B_{mc}-B_m)(B_m-B_w) \end{bmatrix} \begin{bmatrix} y \\ m \\ c \end{bmatrix}$ | $1 \geq m \geq c \geq y \geq 0$ |
| (5) | C/Y/M | $\begin{bmatrix} R_T-R_w \\ G_T-G_w \\ B_T-B_w \end{bmatrix} = \begin{bmatrix} (R_{ymc}-R_{mc})(R_c-R_w) \\ (G_{ymc}-G_{mc})(G_c-G_w) \\ (B_{ymc}-B_{mc})(B_c-B_w) \end{bmatrix} \begin{bmatrix} y \\ m \\ c \end{bmatrix}$ | $1 \geq c \geq m \geq y \geq 0$ |
| (6) | M/Y/C | $\begin{bmatrix} R_T-R_w \\ G_T-G_w \\ B_T-B_w \end{bmatrix} = \begin{bmatrix} (R_{yc}-R_c)(R_{ymc}-R_{yc})(R_c-R_w) \\ (G_{yc}-G_c)(G_{ymc}-G_{yc})(G_c-G_w) \\ (B_{yc}-B_c)(B_{ymc}-B_{yc})(B_c-B_w) \end{bmatrix} \begin{bmatrix} y \\ m \\ c \end{bmatrix}$ | $1 \geq c \geq y \geq m \geq 0$ |

FIG. 18

| INK SUPERPOSITION | PRINT AREA CALCULATION EQUATION | CONDITION |
|---|---|---|
| (1) C/M/Y/1 | $\begin{bmatrix}(R_w-R_k)(E_R-1)\\(G_w-G_k)(E_G-1)\\(B_w-B_k)(E_B-1)\end{bmatrix} = \begin{bmatrix}(R_y-R_w)&(R_{ym}-R_y)&(R_k-R_{ym})\\(G_y-G_w)&(G_{ym}-G_y)&(G_k-G_{ym})\\(B_y-B_w)&(B_{ym}-B_y)&(B_k-B_{ym})\end{bmatrix}\begin{bmatrix}y\\m\\c\end{bmatrix}$ | $0 \leqq c \leqq m \leqq y \leqq 1$ |
| (2) C/M/Y/1 | $\begin{bmatrix}(R_w-R_k)(E_R-1)\\(G_w-G_k)(E_G-1)\\(B_w-B_k)(E_B-1)\end{bmatrix} = \begin{bmatrix}(R_y-R_w)&(R_k-R_{yc})&(R_{yc}-R_y)\\(G_y-G_w)&(G_k-G_{yc})&(G_{yc}-G_y)\\(B_y-B_w)&(B_k-B_{yc})&(B_{yc}-B_y)\end{bmatrix}\begin{bmatrix}y\\m\\c\end{bmatrix}$ | $0 \leqq m \leqq c \leqq y \leqq 1$ |
| (3) C/M/Y/1 | $\begin{bmatrix}(R_w-R_k)(E_R-1)\\(G_w-G_k)(E_G-1)\\(B_w-B_k)(E_B-1)\end{bmatrix} = \begin{bmatrix}(R_{ym}-R_m)&(R_m-R_w)&(R_k-R_{ym})\\(G_{ym}-G_m)&(G_m-G_w)&(G_k-G_{ym})\\(B_{ym}-B_m)&(B_m-B_w)&(B_k-B_{ym})\end{bmatrix}\begin{bmatrix}y\\m\\c\end{bmatrix}$ | $0 \leqq c \leqq y \leqq m \leqq 1$ |
| (4) C/Y/M/1 | $\begin{bmatrix}(R_w-R_k)(E_R-1)\\(G_w-G_k)(E_G-1)\\(B_w-B_k)(E_B-1)\end{bmatrix} = \begin{bmatrix}(R_k-R_{mc})&(R_m-R_w)&(R_{mc}-R_m)\\(G_k-G_{mc})&(G_m-G_w)&(G_{mc}-G_m)\\(B_k-B_{mc})&(B_m-B_w)&(B_{mc}-B_m)\end{bmatrix}\begin{bmatrix}y\\m\\c\end{bmatrix}$ | $0 \leqq y \leqq c \leqq m \leqq 1$ |
| (5) Y/M/C/1 | $\begin{bmatrix}(R_w-R_k)(E_R-1)\\(G_w-G_k)(E_G-1)\\(B_w-B_k)(E_B-1)\end{bmatrix} = \begin{bmatrix}(R_k-R_{mc})&(R_{mc}-R_c)&(R_c-R_w)\\(G_k-G_{mc})&(G_{mc}-G_c)&(G_c-G_w)\\(B_k-B_{mc})&(B_{mc}-B_c)&(B_c-B_w)\end{bmatrix}\begin{bmatrix}y\\m\\c\end{bmatrix}$ | $0 \leqq y \leqq m \leqq c \leqq 1$ |
| (6) M/Y/C/1 | $\begin{bmatrix}(R_w-R_k)(E_R-1)\\(G_w-G_k)(E_G-1)\\(B_w-B_k)(E_B-1)\end{bmatrix} = \begin{bmatrix}(R_{yc}-R_c)&(R_k-R_{yc})&(R_c-R_w)\\(G_{yc}-G_c)&(G_k-G_{yc})&(G_c-G_w)\\(B_{yc}-B_c)&(B_k-B_{yc})&(B_c-B_w)\end{bmatrix}\begin{bmatrix}y\\m\\c\end{bmatrix}$ | $0 \leqq m \leqq y \leqq c \leqq 1$ |

FIG.21(1)    FIG.21(2)    FIG.21(3)
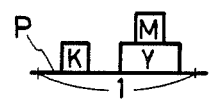 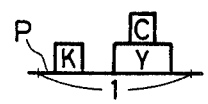 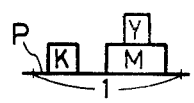
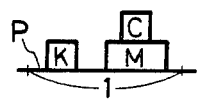  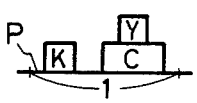
FIG.21(4)    FIG.21(5)    FIG.21(6)

| COLOR\COMBINATION | | (1) | (2) | (3) | (4) | (5) | (6) |
|---|---|---|---|---|---|---|---|
| WHITE | W | $1-(k+y)$ | $1-(k+y)$ | $1-(k+m)$ | $1-(k+m)$ | $1-(k+c)$ | $1-(k+c)$ |
| BLACK | K | k | k | k | k | k | k |
| RED | R | m | o | y | o | o | o |
| GREEN | G | o | c | o | o | o | y |
| BLUE | B | o | o | o | c | m | o |
| YELLOW | Y | y-m | y-c | o | o | o | o |
| MAGENTA | M | o | o | m-y | m-c | o | o |
| CYAN | C | o | o | o | o | c-m | c-y |

FIG. 24

| | COLOR MODIFICATION EQUATION | | CONDITION |
|---|---|---|---|
| (1) | $\begin{bmatrix} R_T-R_w \\ G_T-G_w \\ B_T-B_w \end{bmatrix} = \begin{bmatrix} (R_k-R_w)(R_y-R_w)(R_{ym}-R_y) \\ (G_k-G_w)(G_y-G_w)(G_{ym}-G_y) \\ (B_k-B_w)(B_y-B_w)(B_{ym}-B_y) \end{bmatrix}$ | $\begin{bmatrix} k \\ y \\ m \end{bmatrix}$ | $1 \geq y \geq m \geq 0$ <br> $1 \geq k+y \geq 0$ <br> $1 \geq k \geq 0$ |
| (2) | $\begin{bmatrix} R_T-R_w \\ G_T-G_w \\ B_T-B_w \end{bmatrix} = \begin{bmatrix} (R_k-R_w)(R_y-R_w)(R_{yc}-R_y) \\ (G_k-G_w)(G_y-G_w)(G_{yc}-G_y) \\ (B_k-B_w)(B_y-B_w)(B_{yc}-B_y) \end{bmatrix}$ | $\begin{bmatrix} k \\ y \\ c \end{bmatrix}$ | $1 \geq y \geq c \geq 0$ <br> $1 \geq k+y \geq 0$ <br> $1 \geq k \geq 0$ |
| (3) | $\begin{bmatrix} R_T-R_w \\ G_T-G_w \\ B_T-B_w \end{bmatrix} = \begin{bmatrix} (R_k-R_w)(R_m-R_w)(R_{my}-R_m) \\ (G_k-G_w)(G_m-G_w)(G_{my}-G_m) \\ (B_k-B_w)(B_m-B_w)(B_{my}-B_m) \end{bmatrix}$ | $\begin{bmatrix} k \\ m \\ y \end{bmatrix}$ | $1 \geq m \geq y \geq 0$ <br> $1 \geq k+m \geq 0$ <br> $1 \geq k \geq 0$ |
| (4) | $\begin{bmatrix} R_T-R_w \\ G_T-G_w \\ B_T-B_w \end{bmatrix} = \begin{bmatrix} (R_k-R_w)(R_m-R_w)(R_{mc}-R_m) \\ (G_k-G_w)(G_m-G_w)(G_{mc}-G_m) \\ (B_k-B_w)(B_m-B_w)(B_{mc}-B_m) \end{bmatrix}$ | $\begin{bmatrix} k \\ m \\ c \end{bmatrix}$ | $1 \geq m \geq c \geq 0$ <br> $1 \geq k+m \geq 0$ <br> $1 \geq k \geq 0$ |
| (5) | $\begin{bmatrix} R_T-R_w \\ G_T-G_w \\ B_T-B_w \end{bmatrix} = \begin{bmatrix} (R_k-R_w)(R_{cm}-R_c)(R_c-R_w) \\ (G_k-G_w)(G_{cm}-G_c)(G_c-G_w) \\ (B_k-B_w)(B_{cm}-B_c)(B_c-B_w) \end{bmatrix}$ | $\begin{bmatrix} k \\ m \\ c \end{bmatrix}$ | $1 \geq c \geq m \geq 0$ <br> $1 \geq k+c \geq 0$ <br> $1 \geq k \geq 0$ |
| (6) | $\begin{bmatrix} R_T-R_w \\ G_T-G_w \\ B_T-B_w \end{bmatrix} = \begin{bmatrix} (R_k-R_w)(R_{cy}-R_c)(R_c-R_w) \\ (G_k-G_w)(G_{cy}-G_c)(G_c-G_w) \\ (B_k-B_w)(B_{cy}-B_c)(B_c-B_w) \end{bmatrix}$ | $\begin{bmatrix} k \\ c \\ y \end{bmatrix}$ | $1 \geq c \geq y \geq 0$ <br> $1 \geq k+c \geq 0$ <br> $1 \geq k \geq 0$ |

FIG. 25

| | EQUATION | CONDITION |
|---|---|---|
| (1) | $k = 1 - R_T$<br>$m = 1 - k - G_T$<br>$y = 1 - k - B_T$ | $1 \geq y \geq m \geq 0$<br>$1 \geq k + y \geq 0$<br>$1 \geq k \geq 0$ |
| (2) | $c = \dfrac{G_T - R_T}{G_c}$<br>$k = \dfrac{G_c - R_T(G_c - 1) - G_T}{G_c}$<br>$y = 1 - B_T - \left[\dfrac{G_c - R_T(G_c - 1) - G_T}{G_c}\right]$ | $1 \geq y \geq c \geq 0$<br>$1 \geq k + y \geq 0$<br>$1 \geq k \geq 0$ |
| (3) | $k = 1 - R_T$<br>$m = R_T - G_T$<br>$y = \dfrac{R_T - (R_T - G_T)(1 - B_m) - B_T}{B_m}$ | $1 \geq m \geq y \geq 0$<br>$1 \geq k + m \geq 0$<br>$1 \geq k \geq 0$ |
| (4) | $k = 1 - c - R_T$<br>$m = 1 - k - G_T$<br>$c = \dfrac{B_T - 1 + k + m(1 - B_m)}{B_m(B_c - 1)}$ | $1 \geq m \geq c \geq 0$<br>$1 \geq k + m \geq 0$<br>$1 \geq k \geq 0$ |
| (5) | $m = \dfrac{(B_c - G_c)R_T - B_c G_T + G_c B_T}{G_c B_{cm}}$<br>$c = \dfrac{(B_c - B_{cm} - G_c)R_T + (B_{cm} - B_c)G_T + G_c B_T}{G_c B_{cm}}$<br>$k = 1 - c - R_T$ | $1 \geq c \geq m \geq 0$<br>$1 \geq c + k \geq 0$<br>$1 \geq k \geq 0$ |
| (6) | $c = \dfrac{G_T - R_T}{G_c}$<br>$k = 1 - R_T - \dfrac{G_T - R_T}{G_c}$<br>$y = \dfrac{1 - k - c(1 - B_c) - B_T}{B_c}$ | $1 \geq c \geq y \geq 0$<br>$1 \geq k + c \geq 0$<br>$1 \geq k \geq 0$ |

F I G. 26
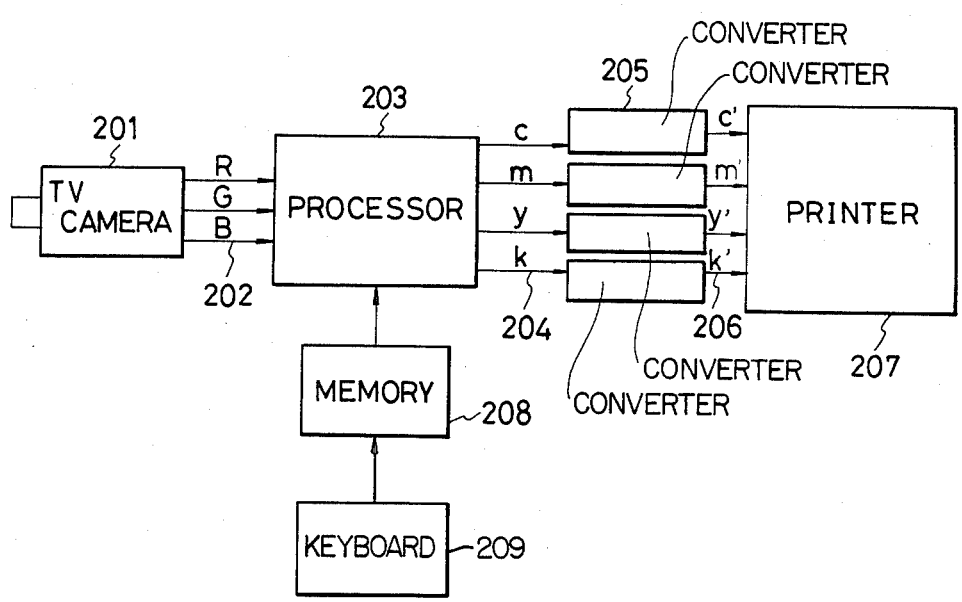

FIG. 28(A)

| 6  | 15 | 11 | 8  |
|----|----|----|----|
| 10 | 2  | 4  | 16 |
| 14 | 3  | 1  | 12 |
| 7  | 13 | 9  | 5  |

| 11 | 2  | 6  | 9  |
|----|----|----|----|
| 7  | 15 | 13 | 1  |
| 3  | 14 | 16 | 5  |
| 10 | 4  | 8  | 12 |

K

FIG.29(1)　　FIG.29(2)　　FIG.29(3)
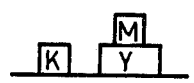 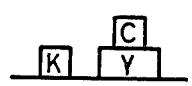 
FIG.29(4)　　FIG.29(5)　　FIG.29(6)
  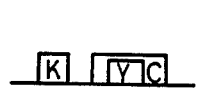

| COLOR | COMBIN-ATION | AREA FACTOR | | | | | |
|---|---|---|---|---|---|---|---|
| | | (1) | (2) | (3) | (4) | (5) | (6) |
| WHITE | W | 1−(k+y) | 1−(k+y) | 1−(k+m) | 1−(k+m) | 1−(k+c) | 1−(k+c) |
| BLACK | K | k | k | k | k | k | k |
| RED | R | m | o | y | o | o | o |
| GREEN | G | o | c | o | o | o | y |
| BLUE | B | o | o | o | c | m | o |
| YELLOW | Y | y−m | y−c | o | o | o | o |
| MAGENTA | M | o | o | m−y | m−c | o | o |
| CYAN | C | o | o | o | o | c−m | c−y |

FIG. 32

| | COLOR MODIFICATION EQUATION | CONDITION |
|---|---|---|
| (1) | $\begin{bmatrix} R_T-R_W \\ G_T-G_W \\ B_T-B_W \end{bmatrix} = \begin{bmatrix} (R_k-R_w)(R_y-R_w)(R_{ym}-R_y) \\ (G_k-G_w)(G_y-G_w)(G_{ym}-G_y) \\ (B_k-B_w)(B_y-B_w)(B_{ym}-B_y) \end{bmatrix} \begin{bmatrix} k \\ y \\ m \end{bmatrix}$ | $1 \geq y \geq m \geq 0$ <br> $1 \geq k+y \geq 0$ <br> $1 \geq k \geq 0$ |
| (2) | $\begin{bmatrix} R_T-R_W \\ G_T-G_W \\ B_T-B_W \end{bmatrix} = \begin{bmatrix} (R_k-R_w)(R_y-R_w)(R_{yc}-R_y) \\ (G_k-G_w)(G_y-G_w)(G_{yc}-G_y) \\ (B_k-B_w)(B_y-B_w)(B_{yc}-B_y) \end{bmatrix} \begin{bmatrix} k \\ y \\ c \end{bmatrix}$ | $1 \geq y \geq c \geq 0$ <br> $1 \geq k+y \geq 0$ <br> $1 \geq k \geq 0$ |
| (3) | $\begin{bmatrix} R_T-R_W \\ G_T-G_W \\ B_T-B_W \end{bmatrix} = \begin{bmatrix} (R_k-R_w)(R_m-R_w)(R_{ym}-R_m) \\ (G_k-G_w)(G_m-G_w)(G_{ym}-G_m) \\ (B_k-B_w)(B_m-B_w)(B_{ym}-B_m) \end{bmatrix} \begin{bmatrix} k \\ m \\ y \end{bmatrix}$ | $1 \geq m \geq y \geq 0$ <br> $1 \geq k+m \geq 0$ <br> $1 \geq k \geq 0$ |
| (4) | $\begin{bmatrix} R_T-R_W \\ G_T-G_W \\ B_T-B_W \end{bmatrix} = \begin{bmatrix} (R_k-R_w)(R_m-R_w)(R_{mc}-R_m) \\ (G_k-G_w)(G_m-G_w)(G_{mc}-G_m) \\ (B_k-B_w)(B_m-B_w)(B_{mc}-B_m) \end{bmatrix} \begin{bmatrix} k \\ m \\ c \end{bmatrix}$ | $1 \geq m \geq c \geq 0$ <br> $1 \geq k+m \geq 0$ <br> $1 \geq k \geq 0$ |
| (5) | $\begin{bmatrix} R_T-R_W \\ G_T-G_W \\ B_T-B_W \end{bmatrix} = \begin{bmatrix} (R_k-R_w)(R_{mc}-R_m)(R_c-R_w) \\ (G_k-G_w)(G_{mc}-G_m)(G_c-G_w) \\ (B_k-B_w)(B_{mc}-B_m)(B_c-B_w) \end{bmatrix} \begin{bmatrix} k \\ m \\ c \end{bmatrix}$ | $1 \geq c \geq m \geq 0$ <br> $1 \geq k+c \geq 0$ <br> $1 \geq k \geq 0$ |
| (6) | $\begin{bmatrix} R_T-R_W \\ G_T-G_W \\ B_T-B_W \end{bmatrix} = \begin{bmatrix} (R_k-R_w)(R_c-R_w)(R_{yc}-R_c) \\ (G_k-G_w)(G_c-G_w)(G_{yc}-G_c) \\ (B_k-B_w)(B_c-B_w)(B_{yc}-B_c) \end{bmatrix} \begin{bmatrix} k \\ c \\ y \end{bmatrix}$ | $1 \geq c \geq y \geq 0$ <br> $1 \geq k+c \geq 0$ <br> $1 \geq k \geq 0$ |

FIG. 35

| No. | INK SUPER-POSITION | PRINT AREA CALCULATION EQUATION | | CONDITION |
|---|---|---|---|---|
| (1) | K M/Y | $\begin{bmatrix}(R_W-R_K)(E_R-1)\\(G_W-G_K)(E_G-1)\\(B_W-B_K)(E_B-1)\end{bmatrix} = \begin{bmatrix}(R_Y-R_W)(R_{YM}-R_Y)(R_K-R_W)\\(G_Y-G_W)(G_{YM}-G_Y)(G_K-G_W)\\(B_Y-B_W)(B_{YM}-B_Y)(B_K-B_W)\end{bmatrix}$ | $\begin{bmatrix}y\\m\\k\end{bmatrix}$ | $0 \leq m \leq y$ $0 \leq k+y \leq 1$ $0 \leq k \leq 1$ |
| (2) | K C/Y | $\begin{bmatrix}(R_W-R_K)(E_R-1)\\(G_W-G_K)(E_G-1)\\(B_W-B_K)(E_B-1)\end{bmatrix} = \begin{bmatrix}(R_Y-R_W)(R_{YC}-R_Y)(R_K-R_W)\\(G_Y-G_W)(G_{YC}-G_Y)(G_K-G_W)\\(B_Y-B_W)(B_{YC}-B_Y)(B_K-B_W)\end{bmatrix}$ | $\begin{bmatrix}y\\c\\k\end{bmatrix}$ | $0 \leq c \leq y$ $0 \leq k+y \leq 1$ $0 \leq k \leq 1$ |
| (3) | K YM | $\begin{bmatrix}(R_W-R_K)(E_R-1)\\(G_W-G_K)(E_G-1)\\(B_W-B_K)(E_B-1)\end{bmatrix} = \begin{bmatrix}(R_{YM}-R_M)(R_M-R_W)(R_K-R_W)\\(G_{YM}-G_M)(G_M-G_W)(G_K-G_W)\\(B_{YM}-B_M)(B_M-B_W)(B_K-B_W)\end{bmatrix}$ | $\begin{bmatrix}y\\m\\k\end{bmatrix}$ | $0 \leq y \leq m$ $0 \leq k+m \leq 1$ $0 \leq k \leq 1$ |
| (4) | K C/M | $\begin{bmatrix}(R_W-R_K)(E_R-1)\\(G_W-G_K)(E_G-1)\\(B_W-B_K)(E_B-1)\end{bmatrix} = \begin{bmatrix}(R_M-R_C)(R_M-R_W)(R_K-R_W)\\(G_M-G_C)(G_M-G_W)(G_K-G_W)\\(B_M-B_C)(B_M-B_W)(B_K-B_W)\end{bmatrix}$ | $\begin{bmatrix}m\\c\\k\end{bmatrix}$ | $0 \leq c \leq m$ $0 \leq k+m \leq 1$ $0 \leq k \leq 1$ |
| (5) | K MC | $\begin{bmatrix}(R_W-R_K)(E_R-1)\\(G_W-G_K)(E_G-1)\\(B_W-B_K)(E_B-1)\end{bmatrix} = \begin{bmatrix}(R_{MC}-R_C)(R_C-R_W)(R_K-R_W)\\(G_{MC}-G_C)(G_C-G_W)(G_K-G_W)\\(B_{MC}-B_C)(B_C-B_W)(B_K-B_W)\end{bmatrix}$ | $\begin{bmatrix}m\\c\\k\end{bmatrix}$ | $0 \leq m \leq c$ $0 \leq k+c \leq 1$ $0 \leq k \leq 1$ |
| (6) | K YC | $\begin{bmatrix}(R_W-R_K)(E_R-1)\\(G_W-G_K)(E_G-1)\\(B_W-B_K)(E_B-1)\end{bmatrix} = \begin{bmatrix}(R_{YC}-R_C)(R_C-R_W)(R_K-R_W)\\(G_{YC}-G_C)(G_C-G_W)(G_K-G_W)\\(B_{YC}-B_C)(B_C-B_W)(B_K-B_W)\end{bmatrix}$ | $\begin{bmatrix}y\\c\\k\end{bmatrix}$ | $0 \leq y \leq c$ $0 \leq k+c \leq 1$ $0 \leq k \leq 1$ |

METHOD AND APPARATUS FOR RECORDING A FULL-COLOR IMAGE WITH A PLURALITY OF COLORANTS ON THE BASIS OF A SET OF AREA FACTORS FOR THE COLORANTS SELECTED FROM A PLURALITY OF SETS OF AREA FACTORS CALCULATED FROM A PLURALITY OF SETS OF EQUATIONS

BACKGROUND OF THE INVENTION

1. Field of the Invention

The present invention relates to a color recording method for recording a color image by superposing a plurality of inks, and an apparatus using the same.

2. Description of the Prior Art

In the field of color recording and photographics, known techniques of recording color images with good fidelity include color modification methods using (1) masking equations and (2) Neugebauer equations. With recent developments in color recording techniques, conventional halftone image recording is changing from utilizing analog recording methods to utilizing digital recording methods.

Typical methods of analog halftone recording include color photographic and color electrophotographic methods. According to such methods, as shown in FIG. 1, three primary colors according to the subtractive color process, i.e., inks of yellow Y, cyan C and magenta M form a complete layered structure on a recording medium P.

Typical methods of digital halftone recording include multicolor superposition printing methods, ink jet recording methods, and binary recording by electrophotographic methods. According to these methods, as shown in FIG. 2(A), layers of inks of a plurality of colors do not form a complete layered structure.

Masking equations relating to the density of the recorded images are established based on the arithmetic mean method. These equations can be used for the superposition method shown in FIG. 1 in which the inks form a complete layered structure. However, the arithmetic mean method cannot be applied to the color superposition method shown in FIG. 2(A) wherein the inks form only a partial layered structure. Accordingly, satisfactory color modification or correction cannot be performed in accordance with the masking equations.

The Neugebauer equations are provided assuming a case wherein the superposition areas of the printing inks are indeterminate and the area factor of the superposition part is proportional to the product of the respective ink areas. Therefore, the Neugebauer equations can only be used if superposition of the printing inks is produced at random by screen corner processing or the like, as is the case in color superposition in printing. However, in the case shown in FIG. 2(A), satisfactory color modification cannot be performed either in accordance with the Neugebauer equations or the masking equations. In addition to this, the Neugebauer equations do not provide a general solution but only provide an approximate solution.

As may be seen from the foregoing, satisfactory color modification cannot be performed with the conventional masking equations or Neugebauer equations.

In order to perform satisfactory halftone recording or the like, black processing is sometimes performed wherein black obtained by superposing all the colors Y, M and C is recorded with black ink. In order to perform this processing, additional processing such as minimum value detection of the black data or under-color removal of the black component from the other color data is required. For this purpose, a memory for storing data, an arithmetic operation circuit for performing complex calculations, and so on are required. This results in slow operation speed.

Meanwhile, color copying machines have been devised which photoelectrically read a color original, perform color separation and produce a color image in accordance with readout signals. In a color copying machine of this type, optical energy of light reflected from or transmitted through the original significantly fluctuates depending upon the material of the original and the reading method. Furthermore, the color signals obtained by photoelectrically reading an original are relative to each other and not absolute values. Therefore, optical energy of an image reproduced in accordance with these signals may differ from that of the original, resulting in a poor image.

SUMMARY OF THE INVENTION

The present invention has been made in consideration of the above and has for an object to provide a color recording method suitable for digital color recording, and an apparatus for the same.

It is another object of the present invention to provide a color recording method of determining a recording area factor of each color suitable for digital color recording, and an apparatus for the same.

It is still another object of the present invention to provide a color recording method of determining a recording area factor of each of a plurality of colors including black suitable for digital color recording so as to perform satisfactory halftone recording, and an apparatus for the same.

It is still another object of the present invention to provide a color recording method capable of optical color image reproduction independently of input/output characteristics, and an apparatus for the same.

The above and other objects, advantages and effects of the present invention will become apparent from the following description taken in conjunction with the accompanying drawings.

BRIEF DESCRIPTION OF THE DRAWINGS

FIGS. 1 and 2(A) and 2(B) are views showing layered structures of recording media;

FIG. 3 shows combinations of C, M and Y in a first embodiment of the present invention;

FIG. 6 is a table showing the reflectivity of light of each color in the combinations shown in FIG. 3;

FIG. 7 is a table showing a simplified form of the equations shown in FIG. 6;

FIG. 8 is a block diagram showing a circuit configuration of the first embodiment of the present invention;

FIG. 15 is a table showing the optical energy of reflected color light of the different color combinations shown in FIG. 12;

FIG. 18 is a table showing the equations shown in FIG. 15 coupled with the input energy;

FIG. 21 shows different types of combinations of black K with two remaining colors in accordance with a third embodiment of the present invention;

FIG. 24 is a table showing the reflectivity of light of each color in the combinations shown in FIG. 21;

FIG. 25 is a table showing a simplified form of the equations shown in FIG. 24;

FIG. 26 is a block diagram of a circuit configuration for achieving the third embodiment of the present invention;

FIGS. 28(A) and 28(B) show dither patterns used in the third embodiment of the present invention;

FIG. 29 shows different types of combinations of black K and two remaining colors according to a fourth embodiment of the present invention;

FIG. 32 is a table showing the reflectivity of light of each color in the combinations shown in FIG. 29;

FIGS. 3(A)–3(D) and 34 illustrate the correction of the optical energy range;

FIG. 35 is a table showing the equations shown in FIG. 32 coupled with the input energy;

DESCRIPTION OF THE PREFERRED EMBODIMENTS

The preferred embodiments of the present invention will now be described in detail with reference to the accompanying drawings.

First Embodiment

Before describing the first embodiment of the present invention, (A) the theoretical background and (B) an actual practice method based on such theoretical background will first be described.

(A) Theoretical Background

Figures 4, 5:
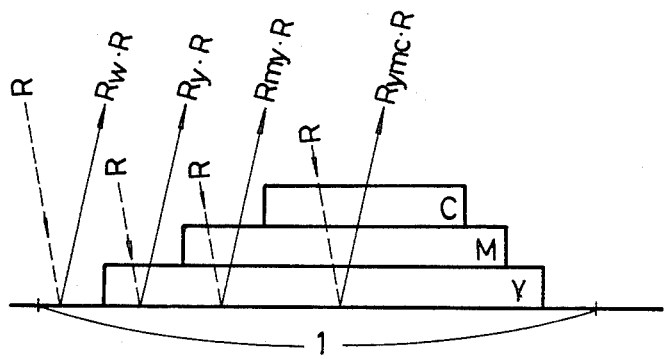
FIG. 4 is a table showing the area factor of each color in the combinations shown in FIG. 3.
FIG. 5 is a representation showing reflectivity.

A case of a full-color display by digital tri-color superposition will be considered. When the three primary colors of the subtractive color process, i.e., cyan, magenta and yellow which are represented by C, M and Y, respectively, are superposed, there are six combinations of color superposition as shown in FIGS. 3(1) to 3(6). A digital halftone expression is determined by how a unit area is occupied with inks, that is, the area factor of each color per unit area. Assume that the unit area of a white recording medium is set to be 1, and area factors of dots of inks of yellow Y, magenta M and cyan C are represented by y, m and c. Then, the area factors of the respective colors white W, black K, red R, Green G, Blue B, yellow Y, magenta M, and cyan C for the combinations shown in FIGS. 3(1) to 3(6) become as shown in FIG. 4.

The combination of the inks shown in FIG. 3(a) will now be examined closely. The reflectivities of the respective color light when red R incident light is reflected by inks of yellow Y, magenta M and cyan C superposed on a recording sheet P, as shown in FIG. 5, are represented by $R_y$, $R_m$ and $R_c$. Furthermore, the reflectivities of the superposed portions $Y+M$, $M+C$, $C+Y$, and $Y+M+C$ of inks of two or three colors of yellow Y, magenta M and cyan C and that of the recording sheet P itself are represented by $R_{my}$, $R_{mc}$, $R_{yc}$, $R_{ymc}$ and $R_w$, respectively. In the case of FIG. 3(1), the red component optical energy R reflected from the printed sheet is given by:

$$R=(1-Y)R_w+(y-m)R_y+(m-c)R_{my}+cR_{ymc}$$

Similarly, the optical energies G and B of the green and blue components in FIG. 3(1) when the reflectivities of the respective color inks are similarly defined are given by:

$$G=(1-Y)G_w+(y-m)G_y+(m-c)G_{my}+cG_{ymc}$$

$$B=(1-y)B_w+(y-m)B_y+(m-c)B_{my}+cB_{ymc}$$

When similar calculations for the other combinations of colors shown in FIGS. 3(1) to 3(6) are performed, the results shown in FIG. 6 can be obtained.

If those reflectivities close to 1 upon actual measurement are assumed to be 1, and those reflectivities close to 0 upon actual measurement are assumed to be 0, that is, if we assume:

$$R_m=R_y=G_y=R_w=G_w=B_w=1$$

$$R_c=G_m=B_y=R_k=G_k=B_k=0 \quad (k=ymc)$$

the equations in FIG. 6 can be simplified as shown in FIG. 7.

A reflectivity of a portion in which two or three color inks are superposed can be considered as a product of the respective colors of the printed inks. For example, $R_{my}=R_m \cdot R_y=1$ and $R_{yc}=R_y \cdot R_c=0$.

The advantages of the color modification equations based on FIGS. 6 and 7 over the conventional color modification equations may be summarized as follows:

(1) From the three primary color signal components from an input apparatus which are represented by R, G and B, the area factors y, m and c of the inks to be directly printed can be determined.

(2) The need for complementary color conversion is omitted as compared to the method based on the conventional color modification equations. Processing by a processor can be performed based on proportional energy elements and density need not be accounted for as in the conventional case.

(3) With the conventional masking equations, the problem with the arithmetic mean method by color superposition is presented. However, according to this method, the reflectivities of color superposed portions can be simply substituted in the color modification equations. Accordingly, problems of dissatisfaction of the arithmetic mean or proportionality are resolved.

(B) Actual Practice Method

An actual practice method for FIGS. 6 and 7 will now be described with reference to FIGS. 8 and 9.

Referring to FIG. 8, an input apparatus is a three-tube TV camera 801. Color separation output signals 802 from the TV camera 801 are supplied to a processor 803. The signals R, G and B have levels between the values of a white signal W as 1 and a black signal B as 0. A memory 807 stores the reflectivities of the respective color components (e.g., $R_y$, $R_m$ and $G_c$, and so on, described above). More specifically, the operator externally enters the respective reflectivities in the equations shown in FIG. 6 by means of a keyboard 808. When approximate values are stored in the memory 807, the simplified equations as shown in FIG. 7 are obtained. The processor 803 comprises a microcomputer, a hardware logic circuit or the like. Based on the reflectivity data stored in the memory 807, the processor 803 calculates six sets of area factors, one for each combination (1) to (6) shown in FIG. 7. Of the six sets of area factors (y, m, c) calculated in this manner, those which satisfy certain conditions are searched for and produced as density signals of the respective colors. A memory storing a table can be used to provide the values of (y, m, c), which is referred to upon input of signals R, G and B and produces the corresponding (y, m, c).

Figure 9:
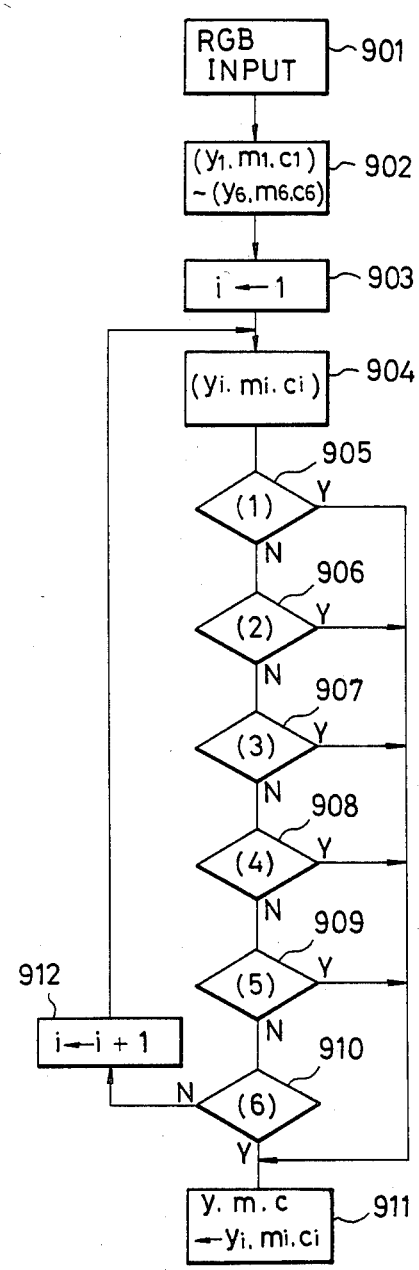
FIG. 9 is a flow chart showing the operation sequence of the processor 803 shown in FIG. 8.
Figure 10:
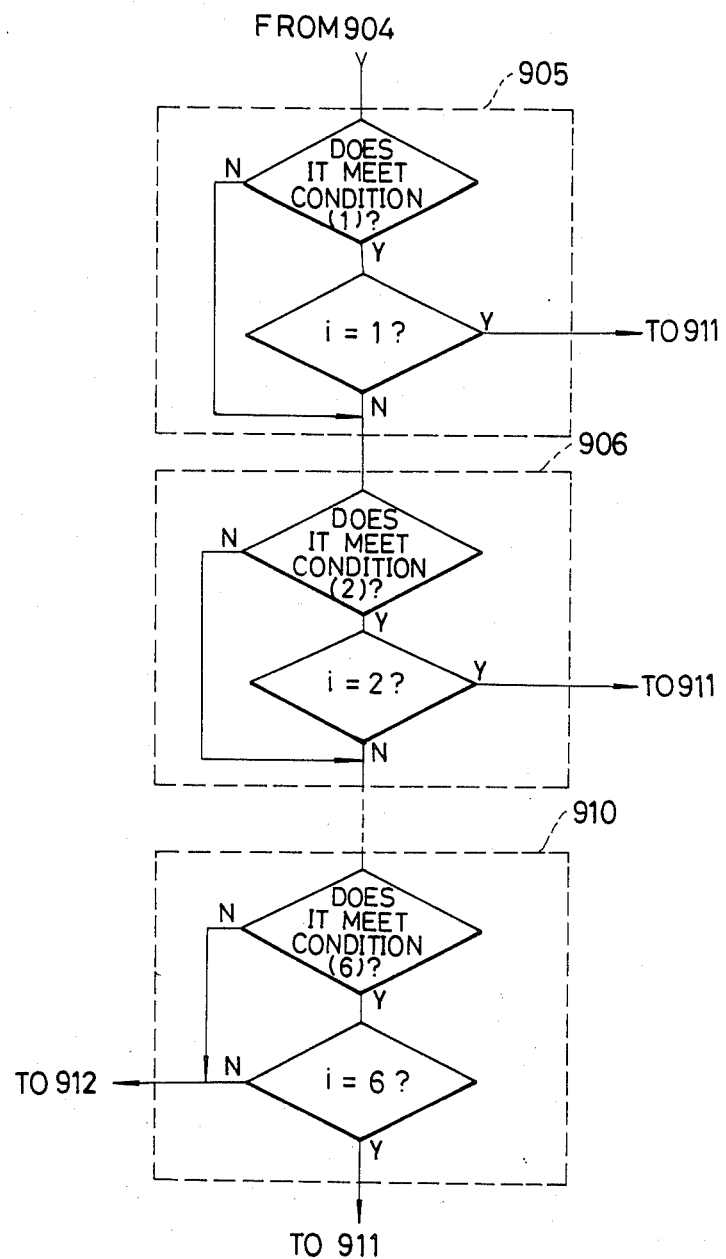
FIG. 10 is a flow chart showing details of the flow chart shown in FIG. 9.

FIG. 9 shows the flow chart of the processing sequence when the processor 803 comprises a microcomputer. In step 901, output data R, G and B from the TV camera 801 are obtained. In step 902, the six sets of $y_i$, $m_i$ and $c_i$ (where i=1 to 6) for the input data R, G and B are calculated, and the calculated results ($y_1$, $m_1$, $c_1$) to ($y_6$, $m_6$, $c_6$) are stored. In step 903, i is set at 1 so as to select ($y_1$, $m_1$, $c_1$) from the six stored sets of y, m and c. In step 904, ($y_i$, $m_i$, $c_i$) is read out based on the value of i. The condition discrimination flow of steps 905 to 910 are, as shown in FIG. 10, included to discriminate whether the calculation result ($y_i$, $m_i$, $c_i$) for each successive value of i based upon the six sets of condition relations of (1) to (6) in FIG. 6 or 7 is equal to 1 to 6, respectively. Then, the combination of the recording areas of inks of colors Y, M and C based on the input data R, G and B is determined. When the data ($y_i$, $m_i$, $c_i$) read out in step 904 does not satisfy any of the condition relations, i is incremented by 1 in step 912, and another series of discrimination operations is performed. The results which satisfy the condition relations are produced as density signals of the respective colors, in step 911. Referring to FIG. 8, output signals y, m and c 804 are produced from the processor 803. A printer 806 prints a full-color image by superposing dots of three colors (yellow, magenta and cyan).

Figure 11:
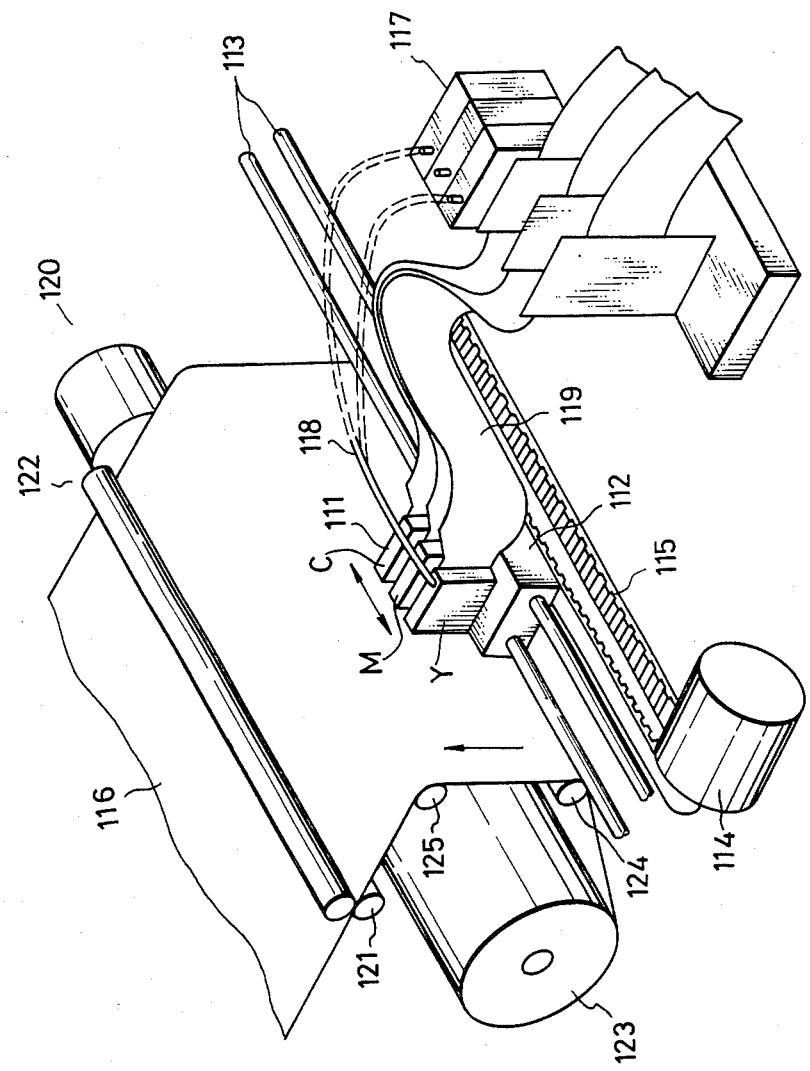
FIG. 11 is a perspective view showing an ink jet printer.

FIG. 11 shows the structure of an ink jet printer as an example of the color printer. A printing head 111 has printing nozzles. This example shows a color ink jet printer. Accordingly, three heads for three colors Y, M and C are fixed on a carriage 112. The carriage 112 is slidably fitted around guide shafts 113 and is driven transversely through a timing belt 115 by a motor 114. As the carriage 112 is driven in this manner, printing on a recording sheet 116 is performed. Tanks 117 store inks of the respective colors which are supplied to the printing nozzles (not shown) of the printing head 111 through supply pipes 118. Printing signals are supplied to the printing head 111 from a flexible printed circuit board 119. A pulse motor 120 drives a paper feed roller 121. A press roller 122 is brought into contact with the paper feed roller 121 so as to allow feeding of the recording sheet 116 therebetween. The recording sheet 116 supplied from a paper feed roller 123 is guided from a lower guide roller 124 to an upper guide roller 125 under a suitable tension while it is being printed. The recording sheet 116 is further guided between the paper feed roller 121 and the press roller 122 and then to a storage section.

In general, the reflectivity characteristics of input data vs. printed results of the printer 806 are not linear. This is for the following reason. Even if the number of printed dots is linear with respect to the input data of the printer 806, the reflectivity from the printed dots generally has non-linear characteristics due to a superposed portion thereof. A non-linearity converter 805 is included to eliminate this using a conversion table for correcting this non-linearity.

Of the six sets of area factors ($y_i$, $m_i$, $c_i$) calculated by the processor 803, those which satisfy the condition relations are supplied to the printer 806 in the form of printing signals through the non-linearity converter 805. Printing on a recording medium such as paper is then performed accordingly.

As may be seen from the above description, input TV signals R, G and B can be used to obtain the ink filling ratios (print area factors) directly without an intermediate complementary converter. When the ink filling ratios are determined, the dot matrix can also be determined in accordance with the digital halftone processing.

FIG. 3 shows a case wherein the inks of colors having higher ink filling ratios are recorded first. However, the order of printing is not limited to this one. The present invention can therefore be similarly applied to a printer wherein the recording orders of colors Y, M and C is fixed.

It is also to be understood that the present invention is applicable to a laser beam printer or a thermal printer.

The input data R, G and B for printing need not be limited to data from a TV camera but may also be data read from an original reader using a solidstate image pickup device or an image file device such as a magnetic or optical disc, or data transmitted through a transmission line.

The present invention is similarly applicable to a method wherein the density of a printed image is expressed by changing the size of a recording dot itself, or a method wherein the density of an image is expressed by changing the number of dots making up each pixel.

In summary, in the embodiment of the present invention, color recording can be performed without a conventional modification circuit, such as a complementary color converter, resulting in a simple circuit configuration.

In digital recording for forming a halftone image in accordance with the density of dots per unit print area and the number of colors expressed by superposition of many different color inks, the density signals (y, m, c) of the three colors can be easily obtained from the three input color signals R, G and B of an input device. For this reason, the following effects can be obtained.

(1) The problems of dissatisfaction of the arithmetic mean and proportionality upon color superposition are resolved, and color reproduction with good fidelity can be performed for a wide variety of originals.

(2) Conventionally, in order to perform color modification when the arithmetic mean and proportionality are dissatisfied, a special technician must operate adjustment controls or the like so as to provide the color conversion parameters best suited to each input original. However, according to the present invention, optimal color recording can be performed for different input originals by simply inputting data of reflectivities of respective colors used and the color combinations thereof.

SECOND EMBODIMENT

When a copy of a color original is to be produced, a color reproduction error may be caused by the difference between the optical energy characteristics of an input system including a photoelectric conversion section and an output system including a printer.

The principle for correcting such a color reproduction error and for performing color recording of better quality will now be described.

Figure 12:
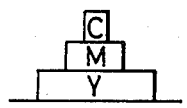
FIG. 12 shows combinations of C, M and Y according to a second embodiment of the present invention.
Figure 12:
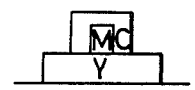
Figure 12:
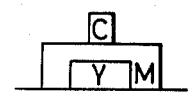
Figure 12:
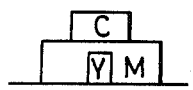
Figure 12:
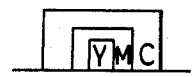
Figure 12:
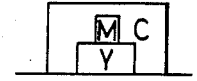

Before describing this embodiment, (A) the theoretical background and (B) an actual practice method based on this theoretical background will be described. (1) Case of a full color display by digital superposition of three colors will be considered. When the three primary colors of the subtractive color method, cyan, magenta and yellow which are represented by C, M and Y, respectively, are superposed, there are six combinations of color superposition as shown in FIG. 12. A digital halftone expression is determined by how inks are printed in a unit area, that is, the ink area factors of the respective colors per unit ares. Assume that the unit area of a white recording medium is set to be 1, and the area factors of dots of the respective colors of yellow Y, magenta M and cyan C are represented by y, m and c, respectively. Then, the area factors of the respective colors of white W, black K, red R, green G, blue B, yellow Y, magenta M and cyan C shown in FIGS. 12(1) to 12(6) become those shown in FIG. 13.

Figures 13, 14:
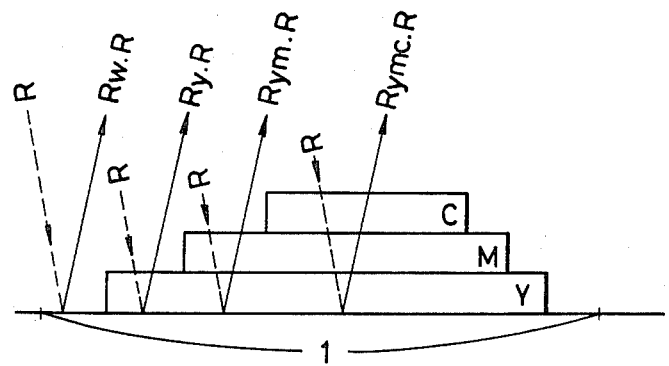
FIG. 13 is a table showing the area factor of each color in the combination shown in FIG. 12.
FIG. 14 is a representation showing reflectivity.
Figure 16A:
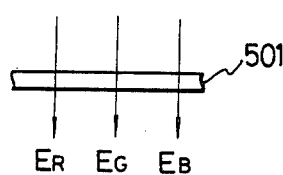
FIGS. 16(A)–16(D) and 17 illustrate the correction of the optical energy range.
Figure 16B:
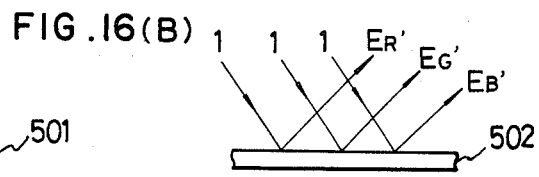
Figure 16C:
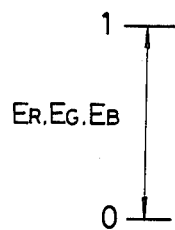
Figure 16D:
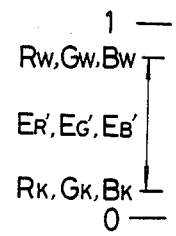

The ink combination of FIG. 12(1) will first be described in detail. As shown in FIG. 14, the reflectivities when red R incident light is reflected by the inks of Y, M and C printed on a recording sheet P, as shown in FIG. 14, are represented by $R_y$, $R_m$ and $R_c$, respectively. The reflectivities of the superposed portions $M+C$, $Y+C$, and $Y+M+C$ of the inks of two or three colors of Y, M and C and that of the recording sheet P are represented by $R_{ym}$, $R_{mc}$, $R_{yc}$, $R_{ymc}$, and $R_w$. In practice, $R_{ym} \neq R_{my}$. This is because when the order of superposing yellow and magenta inks is reversed, the reflectivities of the resultant superposed portions are different. Suffixes of corresponding colors are added to the symbols in the order of closeness to the recording sheet.

In the case of FIG. 12(1), optical energy $R_T$ of red light component reflected from a printer image is given by:

$$R_T = (1-y)R_w + (y-m)R_y + (m-c)R_{ym} + cR_{ymc}.$$

Similarly, optical energies of the green and blue light components in the case of FIG. 12(1) are given by the following equations when the reflectivities from the respective color inks are similarly defined:

$$G_T = (1-y)G_w + (y-m)G_y + (m-c)G_{ym} + cG_{ymc}$$

$$B_T = (1-y)B_w + (y-m)B_y + (m-c)B_{ym} + cB_{ymc}$$

In this manner, the optical energies of the respective color lights for the different combinations shown in FIGS. 12(1) to 12(6) are calculated. The obtained results are summarized in FIG. 15.

FIG. 14 shows the reflected light energy when the printing conditions of FIG. 12 are expressed in a model and color lights of red, green and blue are provided in unit amounts.

The optical energy range which a sensor at the input side receives from an original fluctuates greatly depending upon factors such as whether the original is of a light-transmitting or reflecting original, the type of recording material, and the like, and has a relative value. Accordingly, the optical energy range at the input side does not coincide with that at the output side (recorded side) and some means must be included for providing a correction factor to enable good color image recording.

Figure 17:
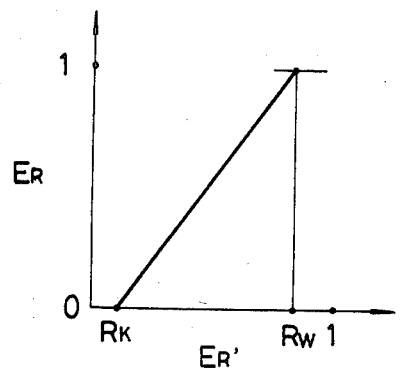

FIG. 16 shows the relationships between these factors. FIG. 16(A) shows optical energies $E_R$, $E_G$ and $E_B$ of the respective colors on a sensor when an input original 501 is a transparent original. Ideally, the following relationships are obtained: $0 \leq E_R \leq 1$, $0 \leq E_G \leq 1$ and $0 \leq E_B \leq 1$, as shown in FIG. 16(C). Meanwhile, the optical energy of a printed image 502 is given by $R_K \leq E_R' \leq R_W$ where $R_W$ is the reflectivity of the white portion of the printed image 502, $R_K$ is the reflectivity of the black portion of the image 502, and $E_R'$ is the optical energy of red light from the image 502. There is also obtained $G_K \leq E_G' \leq G_W$ and $B_K \leq E_B' \leq B_W$ for the other two colors. In general, $R_W < 1$ and $R_K > 0$. In this manner, the optical energy ranges are not the same at the input and output sides. As a method for correcting this difference, linearity correction as shown in FIG. 17 is performed. Accordingly, $E_R = E_R'/(R_W - R_K) - R_K/(R_W - R_K)$ where $E_R'$ corresponds to $R_T$ in FIG. 15. When $E_R'$ is substituted for $R_T$ in FIG. 15, we have $$(R_W - R_K)(E_R - 1) = (R_y - R_W)y + (R_{ym} - R_y)m + (R_K - R_{ym})c.$$

Similarly, the equations as shown in FIG. 18 are obtained for the other colors.

The reflectivity of a portion in which inks of two or three colors are superposed can be considered as a product of reflectivities of the respective colors. For example, $R_{ym} = R_y \cdot R_m$ and $R_{yc} = R_y \cdot R_c$.

The advantages of the color modification equations based on FIG. 18 over the conventional color modification equations are as follows:

(1) When the three primary color signal components from an input device are represented by R, G and B, area factors y, m and c of the inks to be directly printed can be determined by substituting the signals R, G and B in $E_R$, $E_G$ and $E_B$ in the equations shown in FIG. 18.

(2) The need for complementary color conversion is omitted unlike in the conventional color modification equations. The concept of proportional energy elements is adopted in the processor, and the idea of density need not be considered as in the conventional case.

(3) In the case of the conventional masking equations, there is a problem of dissatisfaction of the arithmetic mean upon color superposition. However, according to the method of the present invention, the reflectivities of the color superposed portions are measured, and are substituted in the color modofication equations. Therefore, the problems of dissatisfaction of the arithmetic mean and proportionality is resolved.

(4) The range of optical energy of an original and that of a printed image, that is, the ranges of optical energy at input and output sides are corrected, so that suitable area factors y, m and c can be calculated.

(B) ACTUAL PRACTICE METHOD

The practical method for FIG. 18 will now be described with reference to FIGS. 19 and 20.

Figure 19:
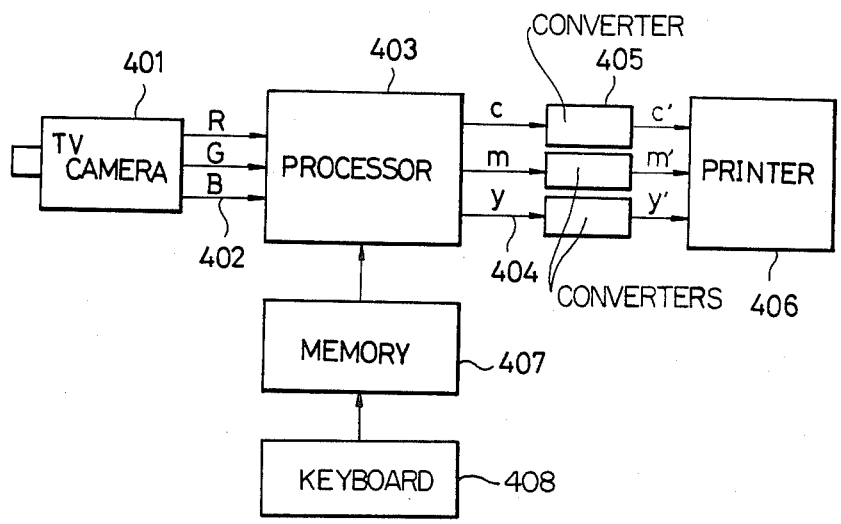
FIG. 19 is a block diagram showing a circuit configuration for accomplishing a second embodiment of the present invention.

Referring to FIG. 19, an input apparatus is a three-tube TV camera 401. Color separation output signals 402 from the TV camera 401 are supplied to a processor 403. The signals R, G and B have levels between the values of a white signal W as 1 and a black signal K as 0. A memory 407 stores the reflectivities of the respective color components (e.g., $R_y$, $R_m$ and $G_c$, and so on described above). More specifically, the operator externally enters the respective reflectivities in the equations shown in FIG. 18 by means of a keyboard 408. A processor 403 comprises a microcomputer, a hardware logic circuit or the like. Based on the reflectivity data stored in the memory 407, the processor 403 calculates six sets of area factors one for each combination (1) to (6) shown in FIG. 18. Of the six sets of area factors (y, m, c) calculated in this manner, those which satisfy the certain conditions are searched for and produced as density signals of the respective colors.

Figure 20:
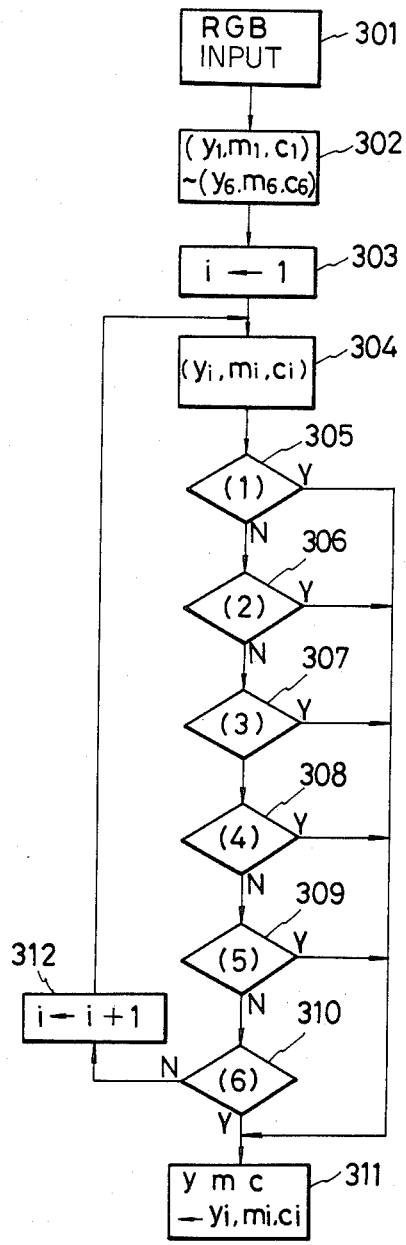
FIG. 20 is a flow chart showing the operation sequence of the processor 403 shown in FIG. 19.

FIG. 20 shows the flow chart of the processing sequence when the processor 403 comprises a microcomputer. In step 301, output data R, G and B from the TV camera 401 are obtained. In step 302, the six sets of $y_i$, $m_i$ and $c_i$ (where i=1 to 6) for the input data $E_R$, $E_G$ and $E_B$ of colors R, G and B are calculated according to the equations shown in FIG. 18, and the calculated results ($y_1$, $m_1$, $c_1$) to ($u_6$, $m_6$, $c_6$) are stored. In step 303, i is set at 1 so as to select ($y_1$, $m_1$, $c_1$) from the six stored sets of y, m and c. In step 304, ($y_i$, $m_i$, $c_i$) is read out based on the value of i. The condition discrimination flow of steps 305 to 310 are included to discriminate whether the calculation result ($y_i$, $m_i$, $c_i$) for each successive value of i based upon the six sets of condition relations of (1) to (6) in FIG. 18 is equal to 1 to 6, respectively. Then, the combination of the recording areas of inks of colors Y, M and C based on the input data R, G and B is determined. When the data ($y_i$, $m_i$, $c_i$) read out in step 304 does not satisfy any of the condition relations, i is incremented by 1 in step 312, and another series of discrimination operations is performed. The results which satisfy the condition relations are produced as density signals of the respective colors, in step 311. Referring to FIG. 19, output signals y, m and c 404 are produced from the processor 403. A printer 406 prints a full-color image by superposing dots of three colors (yellow, magenta and cyan). An ink jet printer as shown in FIG. 11 can be used. In general, the reflectivity characteristics of input data vs. printed results of the printer 406 are not linear. This is for the following reason. Even if the number of printed dots is linear with respect to the input data of the printer 406, the reflectivity from the printed dot generally has non-linear characteristics due to a superposed portion thereof. A non-linearity converter 405 comprising a memory is included to eliminate this using a conversion table for correcting this non-linearity.

Of the six sets of area factors ($y_i$, $m_i$, $c_i$) calculated by the processor 403, those which satisfy the condition relations are supplied to the printer 406 in the form of printing signals through the non-linearity converter 405. Printing on a recording medium such as paper is then performed accordingly.

As may be seen from the above description, input TV signals R, G and B can be used to obtain the ink filling ratios (print area factors) directly without an intermediate complementary converter. When the ink filling ratios are determined, the dot matrix can also be determined in accordance with the digital halftone processing.

Correction of the optical energy ranges at the input and output sides is performed linearly in the above embodiment. However, this may be performed non-linearly if necessary depending upon the characteristics.

A memory table can be used which is addressed by a color signal input from the processor 403 and produces a recording signal.

It is also to be understood that the present invention is applicable to a laser beam printer or a thermal printer.

The input data R, G and B for printing need not be limited to data from a TV camera but may also be data read from an original reader using a solidstate image pickup device or an image file device such as a magnetic or optical disc, or data transmitted through a transmission line.

The present invention is similarly applicable to a method wherein the density of a printed image is expressed by changing the size of a recording dot itself, or a method wherein the density of an image is expressed by changing the number of dots making up each pixel.

In summary, precise color recording with corrected optical energy characteristics at the input and output sides can be performed.

In digital recording for forming a halftone image in accordance with the density of dots per unit print area and the number of colors expressed by superposition of many different color inks, the density signals (y, m, c) of the three colors can be easily obtained from the three input color signals R, G and B of an input device. For this reason, the following effects can be obtained.

(1) The problems of dissatisfaction of the arithmetic mean and proportionality upon color superposition are resolved, and color reproduction with good fidelity can be performed for a wide variety of originals.

(2) Conventionally, in order to perform color modification when the arithmetic mean and proportionality are dissatisfied, a special technician must operate adjustment controls or the like so as to provide the color conversion parameters best suited to each input original. However, according to the present invention, optimal color recording can be performed for different input originals by simply inputting data of reflectivities of respective colors used and color combinations thereof.

THIRD EMBODIMENT

In the first and second embodiments described above, a color image was recorded with three primary colors Y, M and C. A case will now be described wherein black K obtained by superposing colors Y, M and C is printed with black ink.

Before describing the third embodiment, (A) the theoretical background and (B) an actual practice method based on this theoretical background will first be described.

(A) THEORETICAL BACKGROUND

A case will be considered wherein a number of colors are recorded digitally in recording areas of two colors and black, as in the case of FIG. 2(B).

Inks of the three primary colors of the subtractive color process and black, that is, yellow Y, magenta M, cyan C, and black K are prepared as printing inks. When an image is to be recorded on a recording sheet P, there is used black and a maximum of two colors selected from the three other colors so as to provide different color combinations. There are six combinations containing two colors of the three colors, as shown in FIG. 21.

Figures 22, 23:
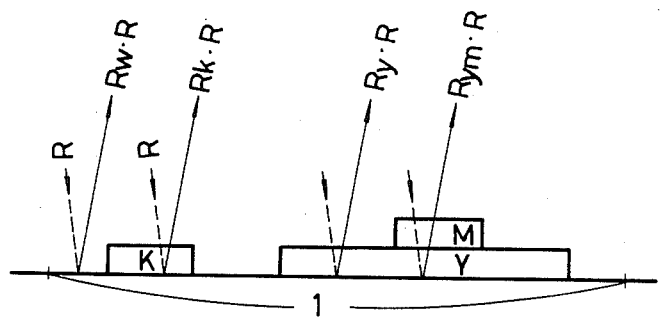
FIG. 22 is a table showing the area factor of each color in the combinations shown in FIG. 21.
FIG. 23 is a representation showing reflectivity.

When the area factors of the inks of the respective colors Y, M, C and K per unit area are represented by y, m, c and k, the area factor of each mixed color of the combinations shown in FIGS. 21(1) to 21(6) is as shown in FIG. 22. Note that the unit area is 1 in this case.

The optical energy of each color reflected from a printed matter on which there is a color image is recorded for each ink combination. The case shown in FIG. 21(1) will be described as an example.

The reflectivities of red, green and blue light reflected by inks of the different colors recorded individually on a recording sheet P are represented by $R_S$, $G_S$ and $B_S$, respectively. Note that S is a suffix indicating y, m, c or k when the ink of corresponding color is used. Similarly, the reflectivities of the light of different colors reflected by inks of two colors are superposed are represented by $R_d$, $G_d$ and $B_d$ for red light, green light and blue light. Note that d is a combination of two colors among colors Y, M and C. Accordingly, $R_{ym}$, for example, represents red light reflectivity when yellow and magenta inks are superposed. In general, even if the same two colors are superposed, the obtained reflectivity is different depending upon the order of superposition of these two colors. Accordingly, the suffix is attached to indicate the order of recording ink layers formed on the recording sheet P. That is, $R_{ym}$ indicates that a yellow ink layer is formed first on the recording sheet P, and a magenta ink layer is formed thereover. Accordingly, $R_{ym} \neq R_{my}$. A suffix W is attached to reflectivity from a white original.

FIG. 23 is a representation showing red light reflectivities for white, black, yellow, and red areas when inks are recorded as shown in FIG. 21(1).

From the area factors of the respective colors shown in FIGS. 21(1), the total red light reflectivity in FIG. 23 is given by:

$$R_T = \{1-(K+y)\}R_W + kR_k + mR_{ym} + (y-m)R_y$$

Modification of this equation yields:

$$R_T = R_w = (R_k - R_w)k + (R_y - R_w)y + (R_{ym} - R_y)m$$

Similarly, the reflective energies $G_T$ and $B_T$ for green light G and blue light B are calculated as shown in column (1) of FIG. 24. The condition relation is $1 \geq y \geq m \geq 0$ from the combination shown in FIG. 21(1). For the black ink K, the condition relation is $1 \geq k \geq 0$. Since the sum of the area factors of the black K and yellow Y is less than 1, we obtain $1 \geq k+y \geq 0$.

A reflectivity close to 1 upon actual measurement is assumed to be 1, and a reflectivity close to 0 upon actual measurement is assumed to be 0. Accordingly, if $$R_m = R_y = G_y = R_w = G_w = B_w = 1$$

$$R_c = G_m = B_y = R_k = G_k = B_k = 0$$

the equations shown in FIG. 24 are simplified as shown in FIG. 25. The reflectivity of a portion in which inks of two colors are superposed can be considered to be a product of the reflectivities of inks of the two colors. For example, $R_{my} = R_m \cdot R_y$.

The advantages of the color modification equations based on FIGS. 24 and 25 over that of the conventional color modification equations can be summarized as follows:

(1) Assume that the three primary color signals from an input device are represented by R, G and B. Then, by setting $R=R_T$, $G=G_T$ and $B=B_T$ in FIGS. 24 and 25 and determining the area factors y, m, c and k of the inks of respective colors to be directly printed, two colors are selected from the three colors excluding black.

(2) The need for complementary color conversion is omitted unlike the case of the conventional color modification equations. Furthermore, under color removal is automatically performed, and the black ink component need not be removed.

(3) In the conventional masking equations, the problem of dissatisfaction of the arithmetic mean upon color superposition is presented. However, according to the present invention, the reflectivities upon color superposition need only be measured and substituted into the color modification equations.

(4) The area factor of black ink for printing is automatically determined in accordance with input signals R, G and B simultaneously with those of other colors.

(B) ACTUAL PRACTICE METHOD

Figure 27:
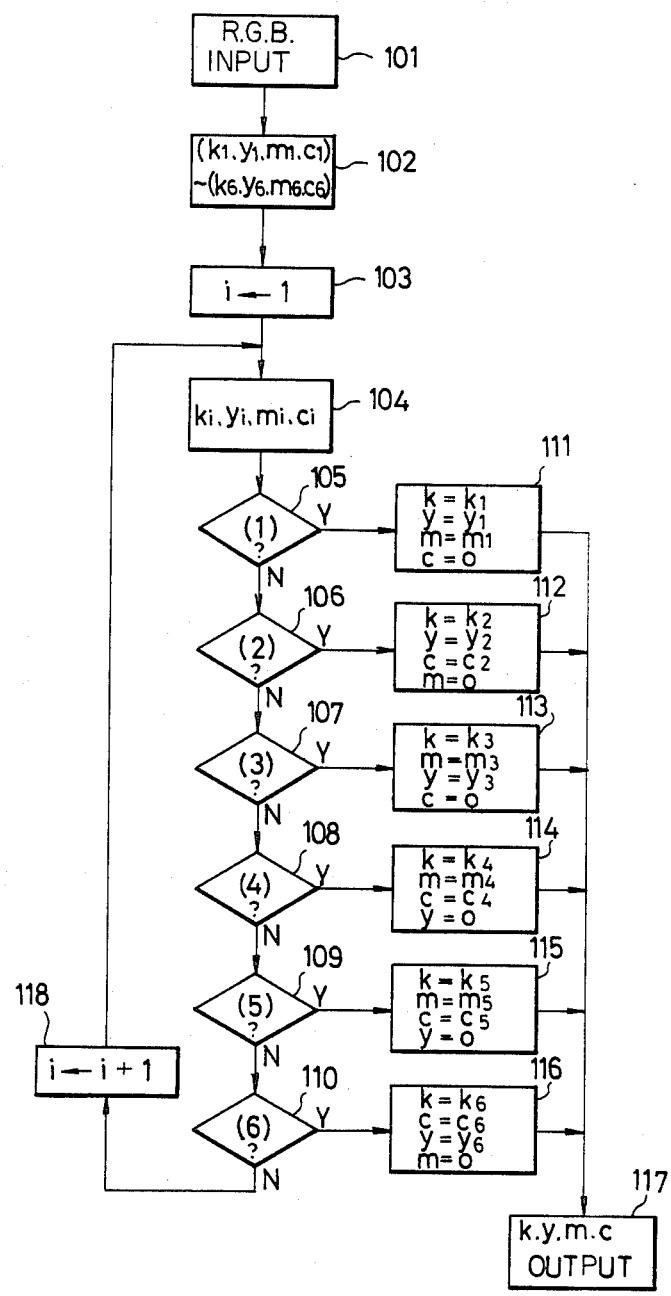
FIG. 27 is a flow chart showing the operation sequence of the processor 203 shown in FIG. 26.

A practice method of achieving color modification as in FIGS. 24 and 25 is shown in FIGS. 26 and 27. An input device in FIG. 26 is a three-tube TV camera 201. Color separation output signals 202 of R (red), G (green) and B (blue) are produced from the TV camera 201 and are supplied to a processor 203 comprising a microcomputer a hardware logic circuit or the like. The signals R, G and B are input light signals of relative value between white 1 and black 0. A memory 208 stores data on reflectivities of the respective color components. The data is entered in the memory 208 by the operator by means of a keyboard 209, and set in the equations as shown in FIG. 24. When approximate data is stored in the memory 208, color modification based on the simplified equations in FIG. 25 can be performed. Based on the reflectivities stored in the memory 208, the processor 203 calculates the printed ink area factors y, m, c and k (204) for each of the six color combinations (1) to (6) based on FIG. 24 or 25 for the input signals R, G and B. The signals R, G and B from the camera 201 are substituted as $R_T$, $G_T$ and $B_T$ in the equations shown in FIG. 24 or 25. Accordingly six calculation results ($k_1$, $y_1$, $m_1$), ($k_2$, $y_2$, $c_2$), ($k_3$, $m_3$, $y_3$), ($k_4$, $m_4$, $c_4$), ($k_5$, $m_5$, $c_5$), and ($k_6$, $c_6$, $y_6$) are obtained. Of these six results, one always satisfies the condition relations. One of the six conbinations (1) to (6) is selected by checking which one of the calculation results satisfies the condition relations.

FIG. 27 is a flow chart showing the processing sequence when the processor 203 comprises a microcomputer. In step 101, the three primary color signals R, G and B are input from the camera 201. In step 102, six ink area factors ($k_i$, $y_i$, $m_i$, $c_i$) are calculated by the processor 203 in accordance with FIG. 24 or 25 and stored in the memory 208. In step 103, i is set to be 1 to select ($k_1$, $y_1$, $m_1$, $c_1$) of the stored six area factors. In step 104, in accordance with the value of i, the six calculation results stored in step 102 are sequentially read out. In steps 105 to 110 to follow, it is checked whether or not the results satisfy the condition relations (1) to (6) when i is 1 to 6.

When i=1, it is determined in step 105 that the calculation result ($k_1$, $y_1$, $m_1$) satisfies the condition relations (1). Then, the flow advances to step 111 wherein black is printed in an area factor $k_1$, yellow is printed in an area factor $y_1$, and magenta is printed in an area factor $m_1$. Cyan is not printed.

If it is determined in step 105 that the condition relations (1) are not satisfied or i is not 1, the flow advances to step 106 wherein it is checked whether the condition relations (2) are satisfied or i=2. In this manner, the printing color selection and print area factors are determined, and corresponding color signals are supplied to an external printer or the like in step 117.

A printer 207 prints an image in accordance with the input data. The printer 207 may be an ink jet printer such as is shown in FIG. 11 with a black head. In the printer 207, the reflectivity of the printed image is not necessarily linear with respect to that of the input data. This is caused for the following reason. Although the input data is linear to the number of print dots, input data and print dot areas are not linear due to the overlap areas of the dots. In order to compensate for this, a correction circuit 205 having a non-linearity correction table for correcting such non-linear characteristics is incorporated.

Accordingly, the print area factors c, m, y and k produced from FIG. 24 or 25 are corrected for nonlinearity, and factors c', m', y' and k' as output 206 are supplied to the printer 207.

As may be seen from the above description, a combination of the inks for printing and area factors of the inks of the respective colors are determined from the output signals R, G and B from the TV camera 201 without an intermediate complementary color converter. Simultaneously, calculation of a black area factor for black processing and associated under-color removal can be performed without requiring a special circuit.

Black ink k must be printed so as not to overlap inks of other colors in low density images. This can be achieved by preparing two dither patterns as shown in FIG. 28; a dither pattern (B) for black ink and a dither pattern (A) for other colors are selectively used for digitally producing a halftone image in accordance with area factors.

Although the above embodiment is described with reference to an ink jet printer, it is also applicable to a laser beam printer, a thermal printer or the like.

The data R, G and B to be recorded may be data read out from an image file or data transmitted through a transmission line.

The present invention can be applied to a method wherein the size of a recording dot itself is changed or a method wherein the number of dots per pixel is changed.

In summary, ink color combinations can be selected from the input data R, G and B, and area factors of inks of respective selected colors and black are simultaneously determined.

Under-color removal for the black ink is automatically performed, so special under-color removal processing need not be performed.

The problem of dissatisfaction of the arithmetic mean and proportionality is resolved. Color image recording for a wide variety of input originals can be performed with good reproduction characteristics. Conventionally, a technician must operate adjustment controls so as to determine color conversion parameters which match each input original and to provide optimal output conditions. The present invention is free from such problems. When the reflectivities of inks of the respective colors and color combination portions are known, optimal color modification for all kinds of originals can be performed.

FOURTH EMBODIMENT

As has been described with reference to the second embodiment, a color recording error can be caused due to the difference in the optical energy characteristics of input and output systems in a color image recording system.

The embodiment for performing excellent color recording free from such an error will now be described.

Before describing the fourth embodiment, (A) the theoretical background and (B) an actual practice method based on the theoretical background will first be described.

(A) THEORETICAL BACKGROUND

As shown in FIG. 2(B), a case is considered wherein a number of colors are reproduced by digital recording of two colors and black.

Four printing inks are prepared for the three primary colors of the subtractive color process and black, that is, yellow Y, magenta M, cyan C and black K. All colors can be recorded on a recording sheet P when a maximum of two colors are selected from black and the other three colors. The superposing order of the three colors is determined to be Y, M and C from below. There are six combinations of two colors from the three colors.

This is shown in FIG. 29.

Figures 30, 31:
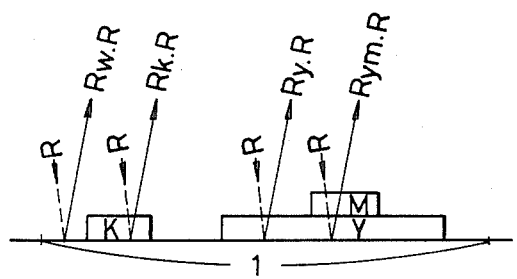
FIG. 30 is a table showing the area factor of each color in the combinations shown in FIG. 29.
FIG. 31 is a representation showing reflectivity.
Figure 33A:
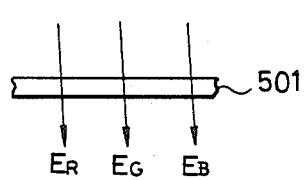
Figure 33B:
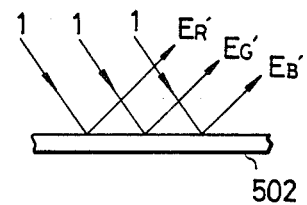
Figure 33C:
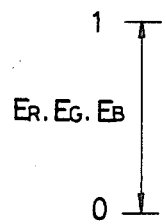
Figure 33D:
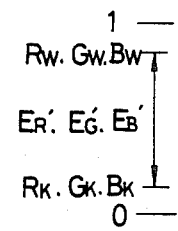

When the area factors of the inks of Y, M, C and K per unit area are represented by y, m, c and k, the area factors of combined colors of combinations (1) to (6) in FIG. 29 become as shown in (1) to (6) of FIG. 30. The unit area is set to be 1.

The respective color light energy reflected from a printed image of each color combination is calculated.

Red light reflectivity, green light reflectivity, and blue light reflectivity when each color ink is recorded on the recording sheet P are represented by $R_S$, $G_S$, and $B_S$. Note that S is a suffix which indicates which one of the inks of yellow, magenta, cyan and black is used. Similarly, red light reflectivity, green light reflectivity and blue light reflectivity when two different colors are recorded are represented by $R_d$, $G_d$ and $B_d$. Note that d indicates each combination of two colors selected from the three colors Y, M and C. For example, $R_{ym}$ represents the red light reflectivity when magenta ink is recorded on yellow ink.

In general, even if the same two colors are superposed, the reflectivity is different depending upon the order of superposition. Accordingly, the suffix is attached which indicates the order of superposition. For example, $R_{ym}$ indicates that yellow ink is recorded on the recording sheet P first and then magenta ink is recorded thereover. That is, $R_{ym} \neq R_{my}$. A suffix W is attached to a reflectivity from a white recorded portion.

FIG. 31 shows the reflectivities of red light from white, black, yellow and red areas when inks are recorded in the combination as shown in FIG. 29(1).

From the area factors of the respective colors of FIG. 29(1), the total red light reflection energy $R_T$ in FIG. 30 can be given as:

$$R_T = \{1 - (K+y)\}R_W + kR_k + mR_{ym} + (y-m)R_y$$

Similarly, reflection energies $G_T$ and $B_T$ for green light G and blue light B are calculated. Rewriting of the equation above provides the equations of column (1) of FIG. 32.

The values indicated are relative values of optical energies from a printed image when the printed state is regarded as a model as shown in FIG. 31 and light of red, green and blue color is irradiated on the printed image. The optical energy range of light received from an original by a photosensor at the input side of the TV camera largely fluctuates depending upon various factors such as whether the original is transparent or reflecting-type original, the material of the original and the like. In general, the optical energy range at the input side does not coincide with that from a printed image, and some correction must be performed.

Figure 34:
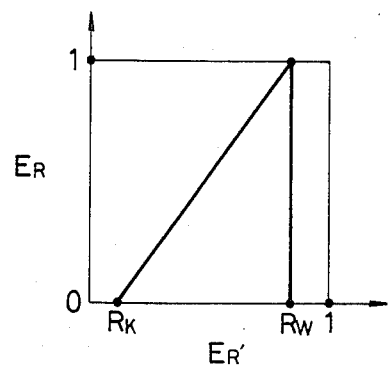

FIG. 33 shows the relationship between the optical energy ranges at the input and output sides. FIG. 33(A) shows a case wherein an input original 501 is a transparent original. An optical energy range $E_R$ for red light on a sensor ideally satisfies the relation $0 \leq E_R \leq 1$, as shown in FIG. 33(C). There are also relations $0 \leq E_G \leq 1$ and $0 \leq E_B \leq 1$, for the remaining colors. The optical energy range $E_R'$ of reflected light from a printed image 502 for red light is given by $R_k \leq E_R' \leq R_W$ as shown in FIG. 33(D) where $R_W$ is the write area reflectivity and $R_k$ is the black area reflectivity. In practice, the reflectivity $R_W$ from the white background is less than 1, and the reflectivity from the black image area is larger than 0. There are also relations $G_k \leq E_G' \leq G_W$ and $B_k \leq E_B' \leq B_W$ for the remaining colors. In this manner, the optical energy E from the original is not equal to the optical energy E' from the printed image. In order to correct such a difference between the optical energies at the input and output sides, linear correction as shown in FIG. 34 is performed.

Accordingly, we have $E_R = E_R'/(R_W - R_k) - R_k/(R_W - R_k)$. The thus corrected value $E_R'$ corresponds to $R_T$ in FIG. 32. When $E_R'$ is substituted for $R_T$ in the equations of column (1) of FIG. 32, we have $R(R_W - R_k)(E_R - 1) = (R_k - R_W)k + (R_y - R_W)y + (R_{ym} - R_y)m$. Similar rewriting of equations can be performed for the other colors, and the equations shown in FIG. 29 can be rewritten as FIG. 35. In this manner, optical energy correction for images at the input and output sides can be performed.

The advantages of the color modification equations shown in FIG. 35 over the conventional color modification equations are summarized as follows:

(1) When the three primary color signal components from an input device are represented by R, G and B, area factors y, m, c and k of inks to be printed for $R = E_R$, $G = E_G$, and $B = E_B$ in the equations of FIG. 35 are determined. At the same time, two colors selected from the three colors excluding black are automatically determined.

(2) The need for complementary color conversion can be omitted unlike the case of the conventional color modification equations. The under-color removal is automatically performed, and the black ink component need not be removed separately.

(3) With the conventional masking equations, the problem of dissatisfaction of the arithmetic mean upon color superposition is presented. However, according to the present invention, the reflectivities after color superpositions are measured and substituted in the color modification equations. Thus the problem of dissatisfaction of the arithmetic mean and proportionality is omitted.

(4) The area factor of black is automatically determined together with those of other colors from the input signals R, G and B.

(5) The difference between the optical energy characteristics at the input and output sides of an original reader is compensated for so as to allow recording of an excellent color image.

(B) Actual Practice Method

Figure 36:
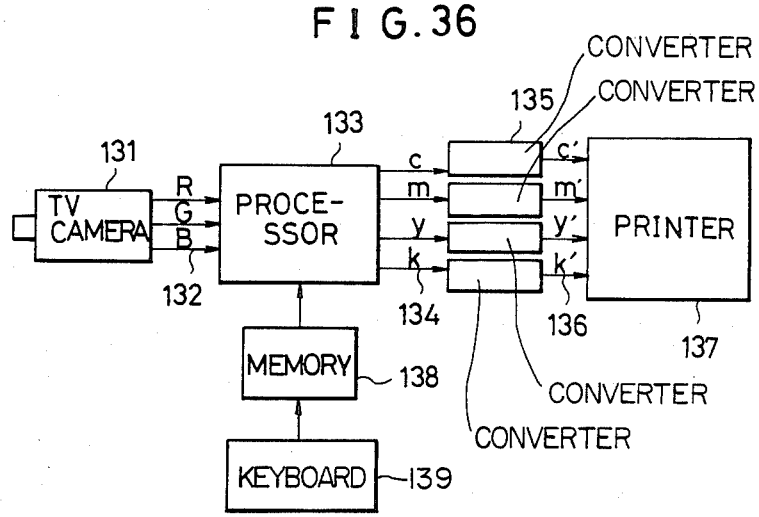
FIG. 36 is a block diagram showing a circuit configuration for achieving the fourth embodiment of the present invention.

The practice method for achieving the color modification as shown in FIG. 35 will now be described with reference to FIGS. 36 and 37. An input device as a three-tube TV camera 131 has a photosensor. Color separation signals 132 of R (red), G (green) and B (blue) from the TV camera 131 are supplied to a processor 133. The signals R, B and G are proportional signals which indicate the relative levels of the incident light energies when the white energy is set to be 1 and the black energy is set to be 0. A memory 138 stores reflectivities of the respective color components. The data of the reflectivities are input through a keyboard 139 by the operator, and stored in the memory 138 to be set in the equations of FIG. 35.

The processor 133 comprises a microcomputer or a hardware logic circuit. Based on the reflectivities of the respective colors stored in the memory 138, the area factors y, m, c and k for each of the six combinations (1) to (6) of input signals R, G and B are calculated and are produced as output 134. Signals R, G and B from the TV camera 132 are directly substituted in $E_R$, $E_G$ and $E_B$ in FIG. 35. Accordingly, six calculation results ($k_1$, $y_1$, $m_1$), ($k_2$, $y_2$, $c_2$), ($k_3$, $m_3$, $y_3$), ($k_4$, $m_4$, $c_4$), ($k_5$, $m_5$, $c_5$), and ($k_6$, $c_6$, $y_6$) are obtained. There is always one calculation result among these six calculation results which satisfies the condition relations. One of the combinations (1) to (6) in FIG. 35 is selected by checking which one of these calculation results satisfies the condition relations.

Figure 37:
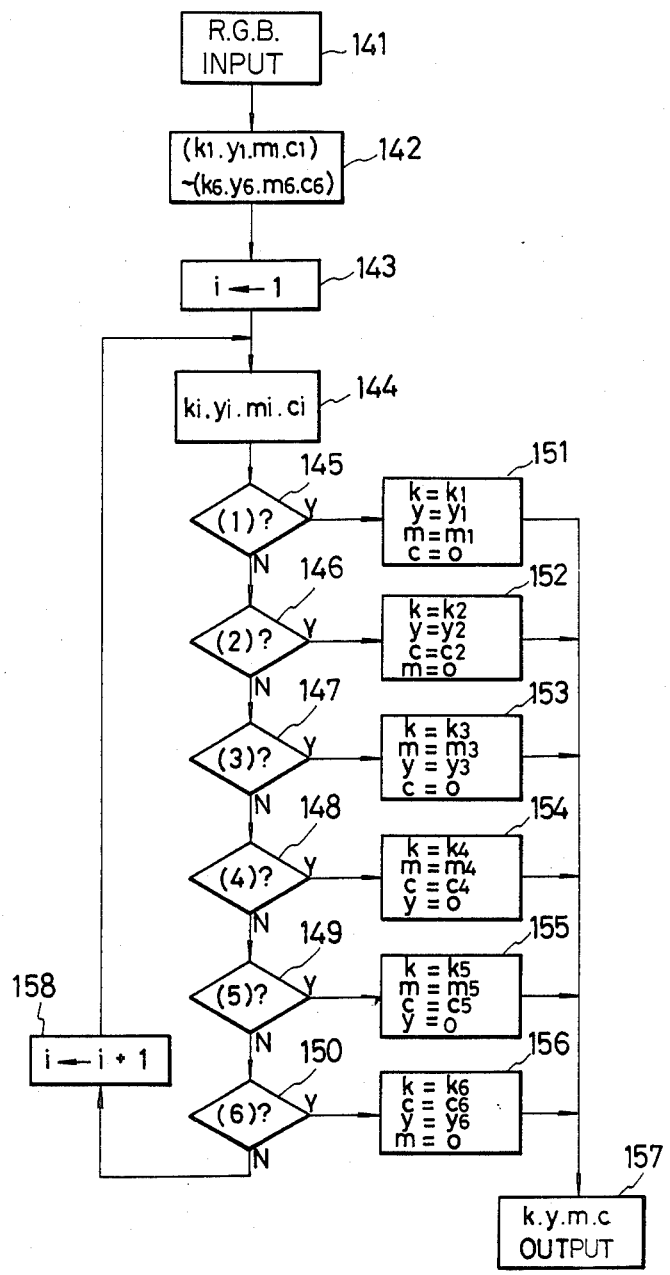
FIG. 37 is a flow chart showing the processing sequence of the processor 133 shown in FIG. 36.

FIG. 37 is a flow chart showing the processing sequence when the processor 133 comprises a microcomputer. In step 141, the three primary color signals R, G and B are supplied from the camera 131. In step 142, six sets of area factors ($k_i$, $y_i$, $m_i$, $c_i$) of each color to be printed are calculated by the processor 133 using the input signals B, G and R as $E_B$, $E_G$ and $E_R$, in accordance with FIG. 35. The obtained area factors are stored in the memory. In step 143, i is set to be 1 so as to produce ($k_1$, $y_1$, $m_1$, $c_1$) selected from the six area factors. In step 144, the six calculation results stored in step 142 are sequentially read out in accordance with the value of i. In steps 145 to 150, it is discriminated whether the condition relations (1) to (6) are satisfied and i is 1 to 6.

For example, if it is determined in step 145 than i=1 and the calculation result ($k_1$, $y_1$, $m_1$) satisfy the condition relations (1), the flow advances to step 151. Printing is performed with an area factor for black of $k_1$, an area factor for yellow of $y_1$ and an area factor for magenta of $m_1$. Cyan is not printed.

If it is determined in step 145 that the condition relations (1) are not satisfied or the value of i is not 1, the flow goes to step 146 wherein it is discriminated whether the condition relations (2) are satisfied. In this manner, the color selection and color ink area factors are determined, and this data is supplied to the external printer in step 157.

A printer 137 records an image in accordance with input data and is, for example, the ink jet printer as shown in FIG. 11 with the black ink head. In the printer 137, the reflectivity of the input data is not necessarily linear to that of the printed image. This is for the following reason. Although the input data and printed dot number are linear, the input data and printed dot area are not linear due to overlapping dots. In order to correct this non-linearity, a correction circuit 135 having a non-linearity correction table is incorporated.

The area factors c, m, y and k for printing produced in accordance with the equations in FIG. 35 are corrected for compensating for the non-linearity, and are converted into c', m', y' and k' as output 136 and supplied to the printer 137.

As may be seen from the above description, the color combinations of the inks and area factors of the selected inks are determined directly from the output signals R, G and B from an input TV camera without an intermediate complementary color converter. Simultaneously, special circuits for calculating the black area factor for black processing and under color removal need not be incorporated.

The black ink must not be printed overlapping inks of other colors in low density images. This may be achieved, for example, by preparing two dither patterns as shown in FIGS. 28(A)–28(B). The dither patterns for digitally producing a halftone image arre used selectively; 28(B) for black ink and 28(A) for inks of other colors.

Although the above embodiment is described with reference to an ink jet printer, the present invention is similarly applicable to a laser beam printer, a thermal printer or the like.

In the correction of the optical energies of the original and the printed image, linear correction is performed in the embodiment described above. However, non-linear correction can be performed depending upon the characteristics. In this case, the data is substituted to provide equations, and the area factors of the respective inks are calculated in accordance with the equations.

The data R, G and B can be data read out from an image file or data transmitted through a transmission line.

The present invention is similarly applicable to a method wherein the size of a recording dot itself is changed or a method wherein the number of dots per pixel are changed for each pixel.

A table which is addressed by input color signals and produces recording signals can be used.

In summary, color combination selection and area factors of inks of the selected colors and black ink are determined from input signals R, G and B with correction for compensating for a difference in the characteristics at the input and output sides. Accordingly, a color image of excellent quality can be recorded.

What we claim is:

1. A method for recording a full-color image comprising a plurality of pixels, the method comprising the steps of:
   detecting levels of three additive primary colors of red, green and blue for each pixel of the image;
   calculating an area factor for each of three subtractive primary colors of yellow, magenta and cyan in response to the levels of the three additive primary colors; and
   forming output pixels in response to the area factors obtained in said calculating step;
   wherein in said calculating step a plurality of sets of area factors are calculated from a plurality of sets of equations corresponding to a plurality of sets of magnitude relationships between area factors, and one set of area factors having the same magnitude relationships as the set of magnitude relationships corresponding to the set of equations from which said one set of area factors was calculated is selected.

2. A method according to claim 1, wherein said output pixels are formed by overlapping dots of the three subtractive primary colors.

3. A method according to claim 1, wherein said plurality of sets of equations comprises six sets of equations.

4. A method for recording a full-color image comprising a plurality of pixels, the method comprising the steps of:
   detecting levels of three additive primary colors of red, green and blue for each pixel of the image;
   calculating in response to the levels of the three additive primary colors area factors for three colors, consisting of black and two of the three subtractive primary colors of yellow, magenta and cyan; and
   forming output pixels in response to the area factors obtained in said calculating step
   wherein in said calculating step a plurality of sets of area factors are calculated from a plurality of sets of equations corresponding to a plurality of sets of magnitude relationships between area factors, and one set of area factors having the same magnitude relationships as the set of magnitude relationships corresponding to the set of equations from which said one set of area factors was calculated is selected.

5. A method according to claim 4, wherein said plurality of sets of equations comprises six sets of equations.

6. A method according to claim 4, wherein said output pixels are formed by dots of black and the two subtractive primary colors, and wherein the position of the black dot within each output pixel is different from the positions of the dots of the two subtractive primary colors.

7. A method according to claim 6, wherein the dots of the two subtractive primary colors are formed in an overlapping manner.

8. An apparatus for recording a full-color image comprising a plurality of pixels, the apparatus comprising:
   entering means for entering levels of three additive primary colors of red, green and blue for each pixel of the image;
   calculating means for calculating an area factor for each of three subtractive primary colors of yellow, magenta and cyan in response to the levels of the three additive primary colors entered by said entering means; and forming means for forming output pixels in response to the area factors obtained by said calculating means;

wherein said calculating means calculates a plurality of sets of area factors from a plurality of sets of equations corresponding to a plurality of sets of magnitude relationships between area factors, and selects one set of area factors having the same magnitude relationships as the set of magnitude relationships corresponding to the set of equations from which said one set of area factors was calculated.

9. An apparatus according to claim 8, wherein said output pixels are formed by overlapping dots of the three subtractive primary colors.

10. An apparatus according to claim 8, wherein said plurality of sets of equations comprises six sets of equations.

11. An apparatus for recording a full-color image comprising a plurality of pixels, the apparatus comprising:

entering means for entering levels of three additive primary colors of red, green and blue for each pixel of the image;

calculating means for calculating in response to the levels of the three additive primary colors area factors for three colors, consisting of black and two of the three subtractive primary colors of yellow, magenta and cyan; and forming means for forming output pixels in response to the area factors obtained by said calculating means;

wherein said calculating means calculates a plurality of sets of area factors from a plurality of sets of equations corresponding to a plurality of sets of magnitude relationships between area factors, and selects one set of area factors having the same magnitude relationships as the set of magnitude relationships corresponding to the set of equations from which said one set of area factors was calculated.

12. An apparatus according to claim 11, wherein said plurality of sets of equations comprises six sets of equations.

13. An apparatus according to claim 11, wherein said output pixels are formed by dots of black and the two subtractive primary colors, and wherein the position of the black dot within each output pixel is different from the positions of the dots of the two subtractive primary colors.

14. An apparatus according to claim 13, wherein the dots of the two subtractive primary colors are formed in an overlapping manner.

* * * * *

UNITED STATES PATENT AND TRADEMARK OFFICE
CERTIFICATE OF CORRECTION

PATENT NO. : 4,683,492                Page 1 of 3

DATED : July 28, 1987

INVENTOR(S) : SUSUMU SUGIURA, ET AL.

It is certified that error appears in the above-identified patent and that said Letters Patent is hereby corrected as shown below:

COLUMN 1

Line 51, "Neugebaur" should read --Neugebauer--.

COLUMN 3

Line 2, "combination" should read --combinations--.
Line 41, "FIGS. 3(A)-3(D)" should read --FIGS. 33(A)-33(D)--.
Line 49, "FIG. 36; and " should read --FIG. 36.--.

COLUMN 6

Line 48, "solidstate" should read --solid-state--.

COLUMN 7

Line 27, "(1)" should be deleted.
Line 27, The heading --(A) THEORETICAL BACKGROUND-- should be inserted.
Line 36, "ares." should read --area.--.

COLUMN 8

Line 31, "is the reflectivity of the white portion of" should not be in italics.
Line 32, "the printed image 502, $R_K$" should not be in italics.

UNITED STATES PATENT AND TRADEMARK OFFICE
CERTIFICATE OF CORRECTION

PATENT NO. : 4,683,492

DATED : July 28, 1987

INVENTOR(S) : SUSUMU SUGIURA, ET AL.

It is certified that error appears in the above-identified patent and that said Letters Patent is hereby corrected as shown below:

COLUMN 9

Line 4, "modofication" should read --modification--.
Line 6, "is" should read --are--.
Line 40, "$(u_6, m_6, c_6)$" should read --$(y_6, m_6, c_6)$--.

COLUMN 10

Line 27, "solidstate" should read --solid-state--.

COLUMN 11

Line 53, "FIGS. 21(1)," should read --FIG. 21(1),--.
Line 55, "$R_T=\{1-(K+y)\}R_W+kR_k+mR_{ym}+(y-m)R_y$" should read --$R_T=\{1-(k+y)\}R_W+kR_k+mR_{ym}+(y-m)R_y$--.

Line 60, "$R_T=R_w=(R_k-R_w)k+(R_y-R_w)y+(R_{ym}-R_y)m$"

should read

--$R_T-R_w=(R_k-R_w)k+(R_y-R_w)y+(R_{ym}-R_y)m$--.

COLUMN 12

Line 47, "microcomputer a" should read --microcomputer, a--.
Line 66, "conbinations" should read --combinations--.

UNITED STATES PATENT AND TRADEMARK OFFICE
CERTIFICATE OF CORRECTION

PATENT NO. : 4,683,492

DATED : July 28, 1987

INVENTOR(S) : SUSUMU SUGIURA, ET AL.

It is certified that error appears in the above-identified patent and that said Letters Patent is hereby corrected as shown below:

COLUMN 15

Line 13, "$R_T=\{1-(K+y)\}R_W+kR_k+mR_{ym}+(y-m)R_y$" should read --$R_T=\{1-(k+y)\}R_W+kR_k+mR_{ym}+(y-m)R_y$--.

Line 40, "write" should read --white--.

Line 55, "$RR_W-R_k)$" should read --$(R_W-R_k)$--.

COLUMN 17

Line 3, "than" should read --that--.
Line 4, "satisfy" should read --satisfies--.
Line 43, "arre" should read --are--.

COLUMN 18

Line 40, "step" should read --step;--.

Signed and Sealed this

Twenty-second Day of December, 1987

Attest:

DONALD J. QUIGG

Attesting Officer         Commissioner of Patents and Trademarks